United States Patent
Rosenberg

(10) Patent No.: US 12,299,758 B2
(45) Date of Patent: May 13, 2025

(54) SECURE MATCHMAKING, ASSET TRANSFER, AND USABILITY RECONFIGURATION PLATFORM

(71) Applicant: SONY INTERACTIVE ENTERTAINMENT LLC, San Mateo, CA (US)

(72) Inventor: Philip Rosenberg, San Mateo, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 17/828,653

(22) Filed: May 31, 2022

(65) Prior Publication Data

US 2023/0385967 A1    Nov. 30, 2023

(51) Int. Cl.
*G06Q 50/18* (2012.01)
*G06Q 30/0601* (2023.01)
(Continued)

(52) U.S. Cl.
CPC ....... *G06Q 50/184* (2013.01); *G06Q 30/0611* (2013.01); *H04L 63/10* (2013.01); *G06Q 20/123* (2013.01)

(58) Field of Classification Search
None
See application file for complete search history.

(56) References Cited

U.S. PATENT DOCUMENTS

| | | |
|---|---|---|
| 10,946,283 B1 | 3/2021 | Meilich et al. |
| 11,392,947 B1 | 7/2022 | Prasad et al. |
| | (Continued) | |

FOREIGN PATENT DOCUMENTS

| | | |
|---|---|---|
| CN | 107563761 A | 1/2018 |
| CN | 110270097 A | 9/2019 |
| | (Continued) | |

OTHER PUBLICATIONS

Application No. PCT/US2023/020180, International Search Report and Written Opinion dated Jul. 21, 2023.
(Continued)

*Primary Examiner* — Christopher Bridges
(74) *Attorney, Agent, or Firm* — Kilpatrick Townsend & Stockton LLP

(57) ABSTRACT

Systems and methods for authorization reconfiguration for digital asset usability are described. An asset management system identifies an asset associated with a video game. A first user device is authorized to use the asset. The first user device is associated with a first user. The asset management system identifies a second user, for instance through a shared characteristic with the first user. A second user device associated with the second user lacks authorization to use the asset. The asset management system receives an indication of a transfer of usability of the asset, such as an indication that the second user has paid for the transfer, or that the conditions of a smart contract have been met. In response to receiving the indication, the asset management system automatically disables authorization for the first user device to use the asset and enables authorization for the second user device to use the asset.

20 Claims, 15 Drawing Sheets

(51) Int. Cl.
*H04L 9/40* (2022.01)
*G06Q 20/12* (2012.01)

(56) References Cited

U.S. PATENT DOCUMENTS

| | | | |
|---|---|---|---|
| 11,501,297 | B1 | 11/2022 | Tai et al. |
| 11,663,551 | B2 | 5/2023 | Stephens et al. |
| 11,741,426 | B2 | 8/2023 | Stephens et al. |
| 11,951,400 | B2 | 4/2024 | Yong |
| 2003/0110126 | A1 | 6/2003 | Dunkeld et al. |
| 2007/0087835 | A1* | 4/2007 | Van Luchene ........ A63F 13/792 463/43 |
| 2012/0231867 | A1 | 9/2012 | Dimitriadis et al. |
| 2014/0108263 | A1 | 4/2014 | Ortiz et al. |
| 2015/0371295 | A1 | 12/2015 | Gill et al. |
| 2017/0005804 | A1 | 1/2017 | Zinder |
| 2017/0032365 | A1 | 2/2017 | Liberty et al. |
| 2017/0103391 | A1 | 4/2017 | Wilson et al. |
| 2017/0232300 | A1 | 8/2017 | Tran et al. |
| 2017/0344987 | A1 | 11/2017 | Davis |
| 2017/0346693 | A1 | 11/2017 | Dix et al. |
| 2018/0013567 | A1 | 1/2018 | Davis |
| 2018/0144292 | A1 | 5/2018 | Mattingly et al. |
| 2018/0189528 | A1 | 7/2018 | Hanis et al. |
| 2018/0197172 | A1 | 7/2018 | Coburn et al. |
| 2019/0232172 | A1 | 8/2019 | Malan |
| 2019/0282906 | A1* | 9/2019 | Yong ................. G06Q 20/0658 |
| 2019/0299105 | A1* | 10/2019 | Knight ............... G06Q 20/0658 |
| 2019/0303892 | A1* | 10/2019 | Yantis ................ G06Q 20/3825 |
| 2020/0078685 | A1* | 3/2020 | Aghdaie ................ A63F 13/79 |
| 2020/0184041 | A1* | 6/2020 | Andon .................. H04L 9/0891 |
| 2020/0192957 | A1 | 6/2020 | Augustine et al. |
| 2021/0082044 | A1* | 3/2021 | Sliwka .................. H04L 9/3255 |
| 2021/0279695 | A1* | 9/2021 | Rice ........................ G06Q 20/12 |
| 2022/0076331 | A1* | 3/2022 | Filter .................. G06Q 20/3276 |
| 2022/0355208 | A1 | 11/2022 | Stephens et al. |
| 2022/0358450 | A1 | 11/2022 | Stephens et al. |
| 2022/0414621 | A1 | 12/2022 | Parlotto et al. |
| 2023/0119838 | A1 | 4/2023 | Meyers et al. |
| 2023/0259900 | A1* | 8/2023 | Engle ..................... G06Q 50/34 705/39 |

FOREIGN PATENT DOCUMENTS

| | | |
|---|---|---|
| CN | 111544890 A | 8/2020 |
| CN | 117138349 A | 12/2023 |
| CN | 110270097 B | 3/2024 |
| CN | 117915996 A | 4/2024 |
| EP | 3765981 | 1/2021 |
| EP | 4334004 | 3/2024 |
| JP | 2017-515252 | 6/2017 |
| JP | 2021-518592 | 8/2021 |
| JP | 2024-516391 | 4/2024 |
| JP | 7495350 | 5/2024 |
| WO | WO 2019/177713 | 9/2019 |
| WO | WO 2020/255372 | 12/2020 |
| WO | WO 2022/235403 | 11/2022 |
| WO | WO 2023/235082 | 12/2023 |

OTHER PUBLICATIONS

Antonopoulos, Andreas M.; "Mastering Bitcon", Dec. 2014, 1st Edition.
Ledger, "Blockchain and Games: A Match Made in Heaven?" Sep. 22, 2020, Retrieved on Jun. 24, 2022.
Dapps_market, "What is CryptoKitties? Guidance to start and play the game!", [online] OESIR, Mar. 12, 2018, Internet: <URL:https://dappsmarket.net/cryptokitties/cryptokitties-howtoplay/>, [retrieved on: Mar. 1, 2023].
Takeshi Kubo, "Basic blockchain course for engineers", [online], Japan Network Information Center, Dec. 27, 2017, pp. 1-63, Internet: <URL:https://www.nic.ad.jp/ja/materials/iw/2017/proceedings/s02/s2-kubo.pdf>, [retrieved on: Mar. 1, 2023].
Nagata03, "Structure of blocks", [online] Qiita Inc., Dec. 2, 2017, Internet: <URL:https://qiita.com/nagata03/items/4ec24c387d037cf155df>, [retrieved on: Mar. 1, 2023].
Chinese Application No. 201910110399.1, First Office Action dated May 23, 2023.
Chinese Application No. 202010166870.1, First Office Action dated Dec. 26, 2022.
Chinese Application No. 202010166870.1, Second Office Action dated Jul. 12, 2023.
Chinese Application No. 202010166870.1, Rejection Decision dated Jan. 4, 2024.
European Application No. 19767701.6, Extended European Search Report dated Nov. 30, 2021.
European Application No. 19767701.6, Office Action dated Oct. 19, 2023.
Japanese Application No. 202-548956, Non-Final Notification of Reasons for Refusal dated Apr. 27, 2023.
PCT Application No. PCT/US2019/016799, International Search Report and Written Opinion dated May 6, 2019.
PCT Application No. PCT/US2019/016799, International Preliminary Report on Patentability dated Sep. 24, 2020.
PCT Application No. PCT/US2022/024670, International Search Report and Written Opinion dated Jul. 20, 2022.
PCT Application No. PCT/US2022/024670, International Preliminary Report on Patentability dated Nov. 16, 2023.
PCT Application No. PCT/US2023/020180, International Search Report and Written Opinion dated Jul. 21, 2023.
U.S. Appl. No. 15/921,471, Office Action dated Mar. 30, 2021.
U.S. Appl. No. 15/921,471, Final Office Action dated Oct. 30, 2020.
U.S. Appl. No. 15/921,471, Office Action dated Mar. 19, 2020.
U.S. Appl. No. 17/315,005, Office Action dated Sep. 9, 2022.
U.S. Appl. No. 17/315,127, Office Action dated Sep. 14, 2022.
So & Sato [online], "Eyeing the NFT boom—digital art and non-fungible tokens," Mar. 31, 2021, Internet <URL:https://innovationlaw.jp/nft-buyer-beware-ip-2/> [retrieved on Sep. 12, 2024].
Japanese Application No. 2023-565392, Non-Final Notification of Reasons for Refusal dated Sep. 17, 2024.
Chinese Application No. 202010166870.1, Third Office Action dated Jul. 12, 2024.

* cited by examiner

| Object | Events |
|---|---|
| Activity (251) | activityAvailabilityChange (id[])<br>activityStart (id,location)<br>activityEnd(id,outcome,location) |
| Zone (252) | locationChange (id,location) |
| Actor (254) | actorSelect (id[]) |
| Mechanic (256) | mechanicAvailabilityChange (id[])<br>mechanicInventoryChange (id[])<br>mechanicLoadoutChange (id[])<br>mechanicUse (id[],')<br>mechanicImpact (id') |
| Game Media (258) | gameMediaUnlock (id)<br>gameMediaStart (id)<br>gameMediaEnd (id) |

*FIG. 2B*

Marketplace

Asset for sale:

Asset 630: Pirate's Flag III DLC Content

Asset info 705:
- Pirate's Flag III
- DLC Content: Premium Ships
- Price requested by seller: $9.99
- Original "new" price: $14.99
- Average "used" price: $10.99

Buttons: [Buy Now at $9.99] [Bid a different amount: $5.99] [Propose a Trade] [Add to Wishlist]

User 640

Seller info 710:
- For sale by user: BugHero62
- Average feedback: 97.9% positive
- Region: North America
- Most played games: Call of Speed: Police Chase, Pirate's Flag III
- Friends in common: Jessica72

Buttons: [Contact Seller] [See other assets being sold by this seller]

*FIG. 7*

Marketplace
Placing this asset for sale:
Pirate's Flag III
DLC Content: Premium Ships
Price requested: 805   $9.99
This price is lower than the average "used" price for this asset
Original "new" price: $14.99
Average "used" price: $10.99
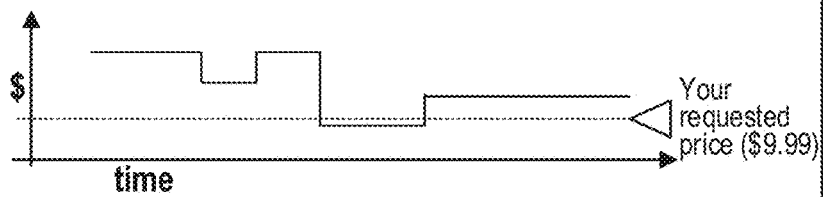
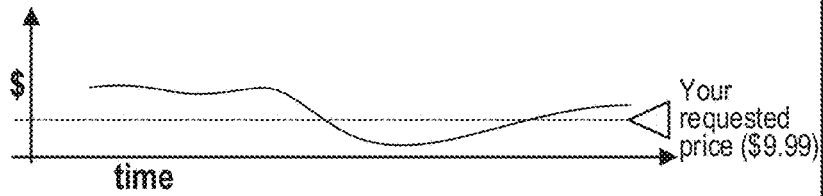
*FIG. 8*

SECURE MATCHMAKING, ASSET TRANSFER, AND USABILITY RECONFIGURATION PLATFORM

BACKGROUND

1. Technical Field

The present technology pertains to transfer of authorization to use a digital asset. More specifically, the present technology may provide various techniques for matching a first user with a second user, and transferring authorization to use a digital asset associated with a video game from a first user device associated with the first user to a second user device associated with the second user.

2. Background

Video gaming is an increasingly popular activity worldwide. Traditionally, video games have been stored on physical media, such as optical discs or cartridges. More recently, users can acquire video games as digital assets onto their devices, for example by downloading digital copies of the video games from a network-based video game marketplace. Similarly, in-game content for video games, sometimes referred to as downloadable content (DLC) or in-app purchases (IAP), can also be acquired by users onto their devices, for example by downloading digital copies of the in-game content from a network-based video game marketplace.

One benefit of traditional video games stored on physical media is that the physical media can be resold from a first user to a second user, transferring ownership of the video game and the ability to use the video game from the first user to the second user. Traditionally, there is no way to resell a digital instance of a video game, or digital in-game content for a video game, from one user to another.

SUMMARY

Aspects of the present technology include systems and methods for reconfiguration for digital asset usability. In some examples, an asset management system identifies an asset associated with a video game. A first user device is authorized to use the asset. The first user device is associated with a first user. The asset management system identifies a second user, for instance based on a shared characteristic with the first user. A second user device associated with the second user lacks authorization to use the asset. The asset management system receives an indication of a transfer of usability of the asset, such as an indication that the second user has paid for the transfer, or that the conditions of a smart contract have been met. In response to receiving the indication, the asset management system automatically disables authorization for the first user device to use the asset, and automatically enables authorization for the second user device to use the asset. Thus, after the transfer, the second user device is authorized to use the asset, and the first user device is no longer authorized to use the asset.

In one example, a system for authorization reconfiguration for digital asset usability t is provided. The system includes a memory and one or more processors (e.g., implemented in circuitry) coupled to the memory. The one or more processors are configured to and can: identify an asset associated with a video game, wherein a first user device is authorized to use the asset, wherein the first user device is associated with a first user; identify a second user, wherein a second user device associated with the second user lacks authorization to use the asset; receive an indication of a transfer of usability of the asset; in response to receiving the indication, automatically disable authorization for the first user device to use the asset; and in response to receiving the indication, automatically enable authorization for the second user device to use the asset.

In another example, a method for authorization reconfiguration for digital asset usability is provided. The method includes: identifying an asset associated with a video game, wherein a first user device is authorized to use the asset, wherein the first user device is associated with a first user; identifying a second user, wherein a second user device associated with the second user lacks authorization to use the asset; receiving an indication of a transfer of usability of the asset; in response to receiving the indication, automatically disabling authorization for the first user device to use the asset; and in response to receiving the indication, automatically enabling authorization for the second user device to use the asset.

In another example, a non-transitory computer-readable medium is provided that has stored thereon instructions that, when executed by one or more processors, cause the one or more processors to: identify an asset associated with a video game, wherein a first user device is authorized to use the asset, wherein the first user device is associated with a first user; identify a second user, wherein a second user device associated with the second user lacks authorization to use the asset; receive an indication of a transfer of usability of the asset; in response to receiving the indication, automatically disable authorization for the first user device to use the asset; and in response to receiving the indication, automatically enable authorization for the second user device to use the asset.

In another example, an apparatus for image processing is provided. The apparatus includes: means for identifying an asset associated with a video game, wherein a first user device is authorized to use the asset, wherein the first user device is associated with a first user; means for identifying a second user, wherein a second user device associated with the second user lacks authorization to use the asset; means for receiving an indication of a transfer of usability of the asset; means for automatically disabling authorization for the first user device to use the asset in response to receiving the indication; and means for automatically enabling authorization for the second user device to use the asset in response to receiving the indication.

BRIEF DESCRIPTION OF THE DRAWINGS

FIG. 2B is a conceptual diagram illustrating an example table of various objects and associated events, according to an aspect of the present disclosure;

FIG. 7 is a conceptual diagram illustrating an example of an interface for purchasing authorization to use a digital asset associated with a video game, according to an aspect of the present disclosure;

FIG. 8 is a conceptual diagram illustrating an example of an interface for appraising a value of a digital asset associated with a video game, according to an aspect of the present disclosure;

DETAILED DESCRIPTION

Figure 1:
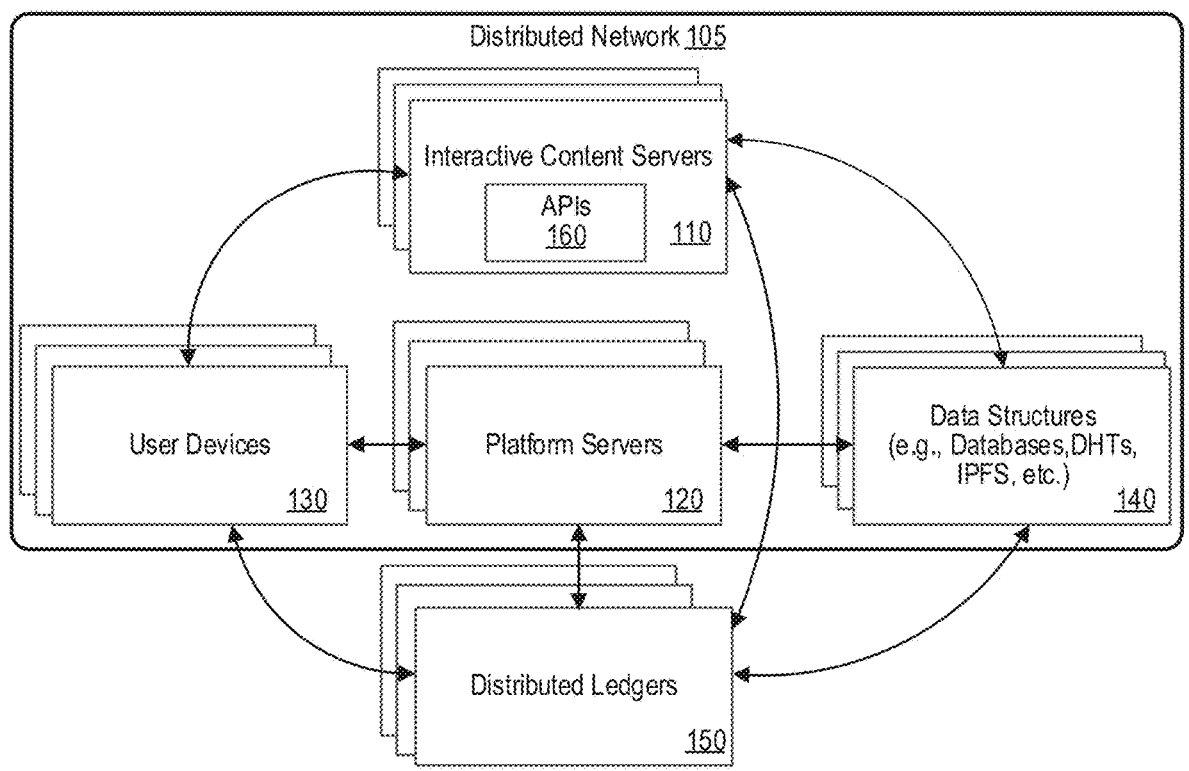
FIG. 1 is a block diagram illustrating an example network environment in which a system for tracking a digital asset associated with a video game using a distributed ledger may be implemented, according to an aspect of the present disclosure.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Techniques and technologies are described for creating, modifying, tracking, authenticating, and/or transferring usability of digital assets associated with video game(s). In some examples, an asset management system identifies an asset associated with a video game, such as an instance of the video game itself, or some in-game content (e.g., downloadable content (DLC), in-app purchases (IAP), characters, items, environments, save files, gameplay recordings, and the like). In some examples, the asset includes a non-fungible token (NFT) associated with the video game. A first user device is authorized to use the asset. For instance, if the asset is an instance of the video game, the first user device is authorized to launch and/or play the video game on the first user device. If the asset is in-game content for the video game, the first user device is authorized to use in-game content within the video game as the video game is played on the first user device. The first user device is associated with a first user. The asset management system identifies a second user. In some examples, the asset management system identifies the second user during a matchmaking process, for instance based on one or more shared characteristics with the first user (e.g., same favorite game, same most-played game, same region, same age group, or some combination thereof). A second user device associated with the second user lacks authorization to use the asset. The asset management system receives an indication of a transfer of usability of the asset. For instance, the indication of the transfer of usability can include an indication that the second user has paid for the transfer, that the second user has agreed to pay for the transfer, that the transfer was authorized by another user (e.g., a parent or guardian of the first user or of the second user), that the conditions of a smart contract have been met, or a combination thereof. In response to receiving the indication, the asset management system automatically disables authorization for the first user device to use the asset, and automatically enables authorization for the second user device to use the asset, thereby effecting the transfer of usability of the asset. Thus, after the transfer of usability of the asset, the second user device is authorized to use the asset, and the first user device is no longer authorized to use the asset. In some examples, the asset management system also causes a second transfer to also take effect in parallel with, or before, or after, the transfer of usability of the asset. The second transfer can include, for instance, a transfer of a second asset (e.g., funds, content associated with the same video game, content associated with a different video game) from the second user to the first user, from the second user to the asset management system, from the asset management system to the first user, or a combination thereof.

In some examples, the asset may be an instance of the video game. In some examples, the asset may be in-game content, such as in-game items, characters, environments (e.g., levels, stages, worlds), objectives, save files, DLC, IAP, or combinations thereof. The asset may be video game digital media asset with media representations of moments of gameplay of a video game, such as video clips, images, and/or audio clips. In some examples, a distributed ledger tracking a history of the asset is created and stored across a plurality of devices of a distributed system. In some examples, a unique token (e.g., an NFT) may be generated for the asset, with a unique identifier for the asset and metadata identifying properties of the asset. The transfer of usability of the asset can include a transfer of ownership, a transfer of a license, a rental, a lease, a demo, or a combination thereof. In some examples, the asset management system can update a distributed ledger, such as a blockchain ledger or a direct acyclic graph (DAG) ledger, with an indication of the transfer of the usability of the asset, for instance in a new block that is appended to the distributed ledger. The new block can include one or more hashes of at least portions of one or more previous blocks in the distributed ledger.

The techniques and technologies described herein expand the capabilities of systems that manage usability of digital assets associated with video games by providing a process through which such systems to transfer usability of such digital assets, for instance by disabling usability of an asset at one user device and enabling usability of the asset at another user device in response to a trigger condition. The techniques and technologies described herein represent a safe and secure platform to effect such transfers of usability of assets, for instance by using smart contracts to securely effect such transfers, distributed ledgers to securely track such transfers, non-fungible tokens (NFTs) to convert assets from fungible to non-fungible, and/or authentication from a third user (e.g., parent and/or guardian) for such transfers. The techniques and technologies described herein allow for secure and comprehensive tracking of the history of a digital asset, for instance tracking when, how, and by whom the digital asset was created, used, modified, rented to, rented by, sold to, purchased by, licensed to, licensed by, exchanged to, exchanged by, transferred to, transferred by, and/or other actions.

FIG. 1 illustrates an example network environment 100 in which a system for tracking a digital asset associated with a video game using a distributed ledger may be implemented, according to an aspect of the present disclosure. The network environment 100 may include one or more interactive content servers 110 that provide streaming content (e.g., interactive video, podcasts, video game content, etc.), one or more platform servers 120, one or more user devices 130, one or more data structures 140, one or more distributed ledgers 150. The one or more distributed ledgers 150 can be stored across a distributed network 115, which can include the one or more interactive content servers 110, the one or more platform servers 120, the one or more user devices 130, the one or more data structures 140, or a combination thereof.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the interactive content servers 110, platform servers 120 and/or the user device 130, in an object file 216 ("object file").

The platform servers 120 may be responsible for communicating with the different interactive content servers 110, data structures 140, and user devices 130. Such platform servers 120 may be implemented on one or more cloud servers. The interactive content servers 110 may communicate with multiple platform servers 120, though the media interactive content servers 110 may be implemented on one or more platform servers 120. The platform servers 120 may also carry out instructions, for example, receiving a user request from a user to stream streaming media (i.e., video games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of interactive content servers 110 to communicate with different platform servers 120 and different user devices 130. API 160 may be specific to the particular computer programming language, operating system, protocols, etc., of the interactive content servers 110 providing the streaming media content titles, the platform servers 120 providing the media and the associated at least one set of object data, and user devices 130 receiving the same. In a network environment 100 that includes multiple different types of interactive content servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 13.

The data structures 140 can include, for example, one or more databases (DBs), one or more distributed hash tables (DHTs), one or more interplanetary file systems (IPFSs), one or more interplanetary linked data (IPLD) structures, one or more tables, one or more hash tables, one or more heaps, one or more trees, one or more lists, one or more arrays, one or more arraylists, one or more dictionaries, one or more matrices, or a combination thereof. The data structures 140 may be stored on the platform server 120, the interactive content servers 110, any of the servers 218 (shown in FIG. 2A), across one or more different servers, on a single server, across different servers, on any of the user devices 130, within the distributed ledgers 150, on devices identified by network locations identified by pointers (e.g., uniform resource identifiers) stored in the distributed ledgers 150, or a combination thereof. Such data structures 140 may store digital assets associated with video games, such as the streaming media, portions thereof, and/or associated set(s) of object data. Such streaming media may depict one or more objects (e.g., activities) that a user can participate in and/or UGC (e.g., screen shots, videos, commentary, mash-ups, etc.) created by peers, publishers of the media content titles and/or third party publishers. Portions of the streaming media may include images, video clips, audio clips, or combinations thereof. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the data structures 140. Each user profile may include information about the user (e.g., user progress in an activity and/or media content title, user id, user game characters, etc.) and may be associated to media.

In some examples, an object and/or an object file 216 is an example of a digital asset associated with a video game that is tracked using one or more of the distributed ledgers 150. In some examples, a portion of media, such as a video clip or image or audio clip of one or more moments of gameplay, is an example of a digital asset associated with a video game that is tracked using one or more of the distributed ledgers 150. The portion of media may be generated, recorded, and/or streamed using the interactive content servers 110, platform servers 120, and/or the user device 130.

In some examples, the distributed ledger 150 may be public. In some examples, the distributed ledger 150 may be private. In some examples, the distributed ledger 150 may be partly public and partly private. In some examples, the distributed ledgers 150 can be controlled by, and restricted to, use for a single video game. In some examples, the distributed ledgers 150 can be controlled by, and restricted to, use for a set of video games, such as a particular series of video games. In some examples, the distributed ledgers 150 can be controlled by, and restricted to, use for a single video game console or video game platform. In some examples, the distributed ledgers 150 can be controlled by, and restricted to, use for a set of video game consoles or video game platforms. In some examples, the set of video game consoles or video game platforms can be associated with a single manufacturer, device type, form factor, operating system (OS), or combination thereof. For instance, the distributed ledgers 150 can be controlled by, and restricted to, use for one or more Sony® platforms and/or one or more Sony® PlayStation® platforms corresponding to one or more types of Sony® devices, such as the Sony® PlayStation® 4, the Sony® PlayStation® 5, the Sony® PlayStation® Vita®, another Sony® PlayStation® portable gaming console, another Sony® PlayStation® home gaming console, a Sony® PlayStationVR® Virtual Reality (VR) system, a Sony® PlayStationTV® home entertainment system, a Sony® tablet, a Sony® mobile handset, or a combination thereof. In some examples, the set of video game consoles or video game platforms can include video game consoles or video game platforms that are associated with more than one manufacturer, device type, form factor, operating system (OS), or combination thereof, for example allowing cross-platform support, cross-device-type support, cross-OS support, or a combination thereof. The blockchain ledger 300 is an example of the distributed ledgers 150.

Figure 2A:
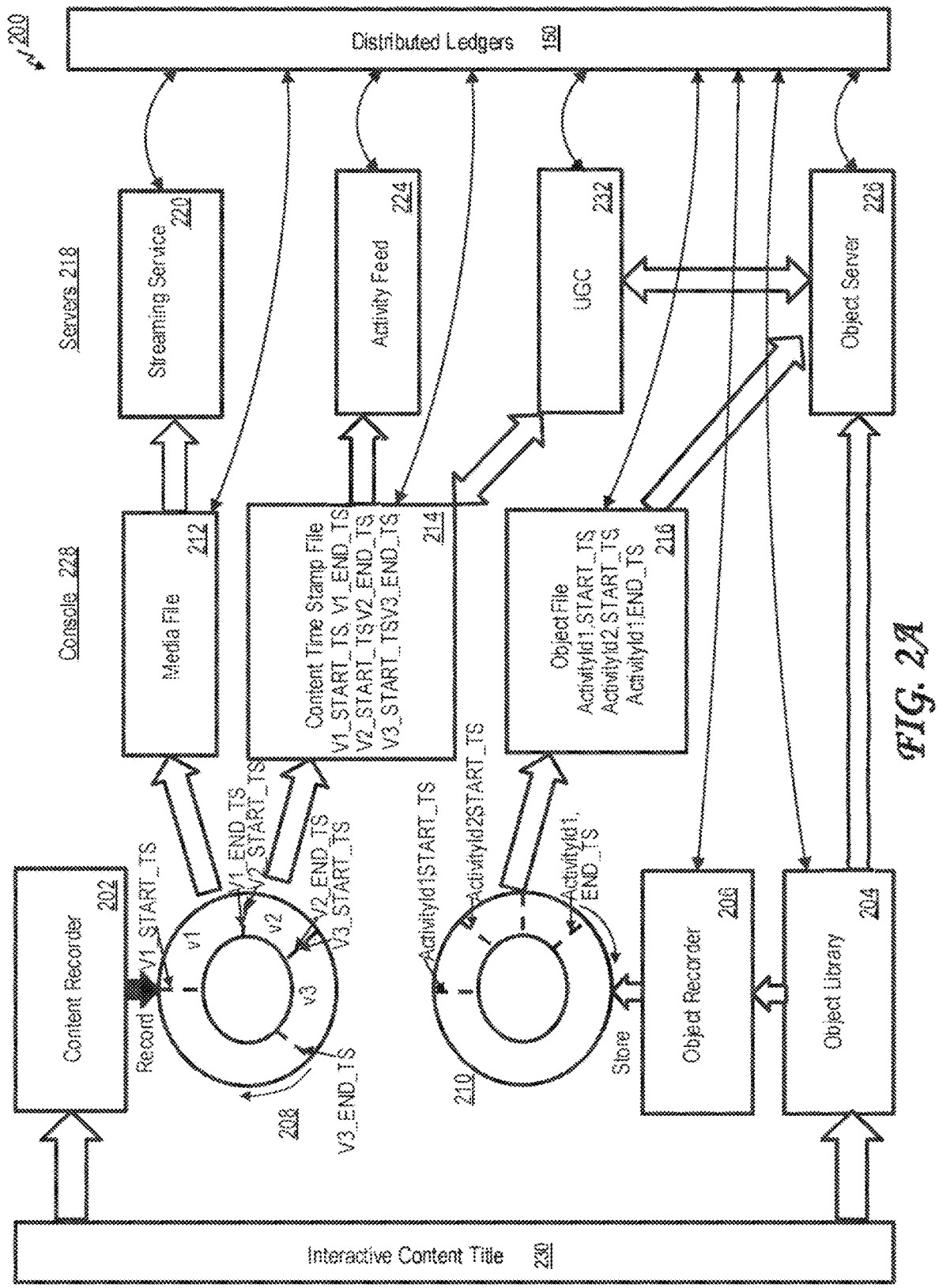
FIG. 2A is a block diagram illustrating an example network environment in which a system for binding object data from a universal data system to media content may be implemented, according to an aspect of the present disclosure.

FIG. 2A is a block diagram illustrating an example network environment 200 in which a system for binding object data from a universal data system to media content may be implemented, according to an aspect of the present disclosure. In the example network environment 200 of FIG. 2A, an example console 228 (e.g., a user device 130) and example servers 218 (e.g., streaming server 220, activity feed server 224, UGC server 232, and an object server 226) are shown. The console 228 may be implemented on the platform server 120, a cloud server, or on any of the servers 218. The console 228 may further includes a content recorder 202 and an object recorder 210, described in more detail below, where content (e.g., media) may be recorded and/or output through the console 228. The interactive various content titles 230 may be executed on the console 228. Alternatively or in addition to, the content recorder 202 may be implemented on the platform server 120, a cloud server, or on any of the servers 218. Such content recorder 202 may receive and record content (e.g., media) from an interactive content title 230 (e.g., interactive content source servers 110) onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 (e.g., a portion of the streaming media) may be uploaded to the streaming server 220 for storage and subsequent streaming or use, though the media file 212 may be stored on any server, a cloud server, any console 228, or any user device 130. The media file 212 may be uploaded periodically and/or in real-time or close to real-time. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Figure 4:
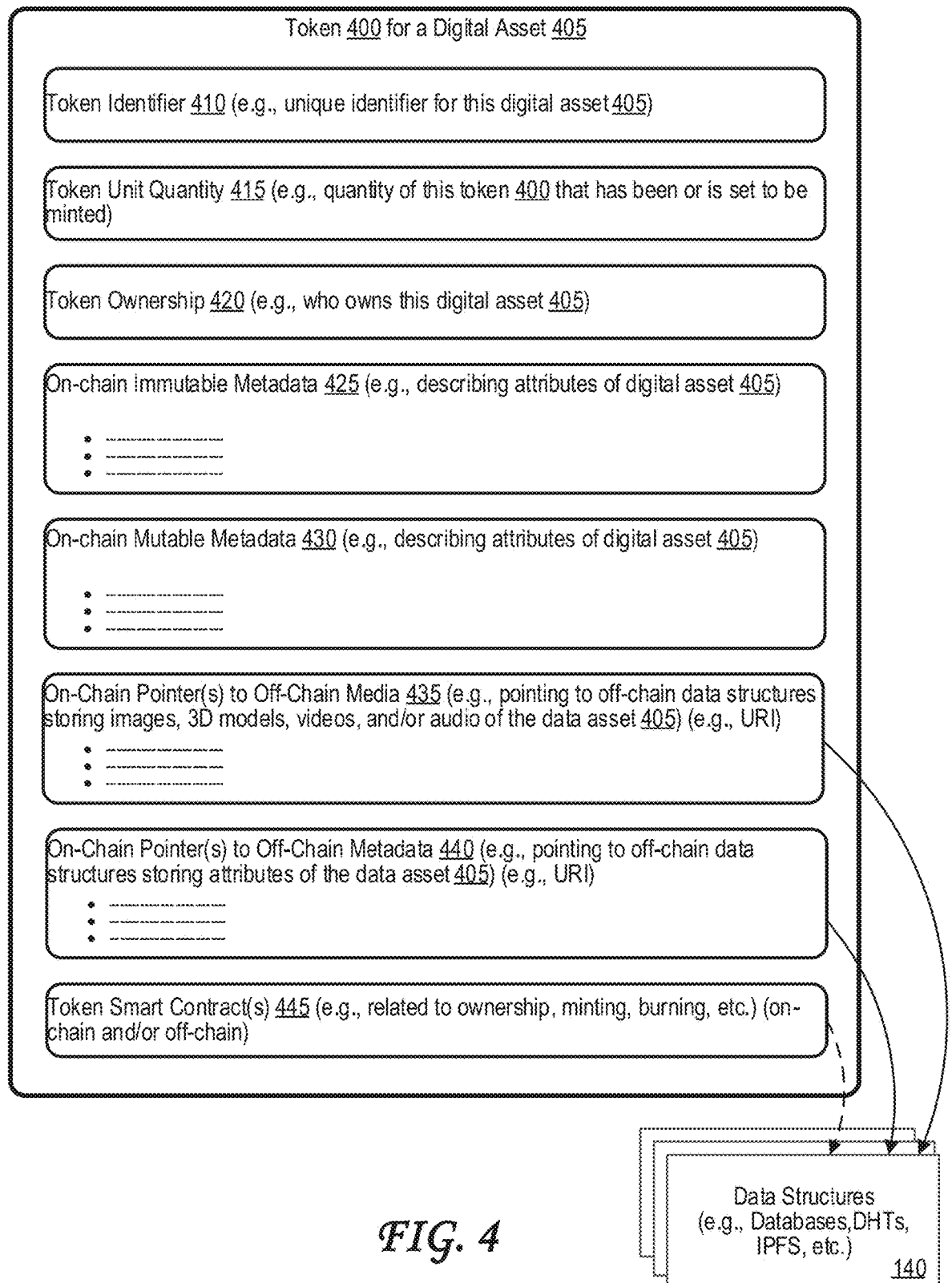
FIG. 4 is a block diagram illustrating an example token that can be non-fungible and that can represent a digital asset associated with a video game as tracked in a distributed ledger, according to an aspect of the present disclosure.

In some examples, the media file 212 may be converted, by the console 228 and/or by the servers 218, into a non-fungible video game digital media asset using a non-fungible token, such as the token 400 of FIG. 4, that is stored in and whose history is tracked across one or more of the distributed ledgers 150. The token corresponding to the media file 212 may include metadata associated with the streaming service 220, the content time stamp file 214, the activity feed 224, the UGC server 232, and/or the object server 226. In some examples, at least some of the actions or activities identified in the activity feed 224 and/or the content time stamp file 214 can be identified in the history of the non-fungible video game digital media asset tracked in the distributed ledgers 150.

Concurrent to the content recorder 202 receiving and recording content from the interactive content title 230, an object library 204 receives object data from the interactive content title 230, and an object recorder 206 tracks the object data to determine when an object beings and ends. Such object data may be uploaded periodically and/or in real-time or close to real-time. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in an object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the object server 226 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for the object file 216. Such query may be executed by searching for an activity ID of the object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 214, 216.

In some examples, an object identified by the object library 204, by the object recorder 206, by the object ring-buffer 210, by the object file 216, and/or by the object server 226 may be converted, by the console 228 and/or by the servers 218, into a non-fungible in-game digital asset using a non-fungible token, such as the token 400 of FIG. 4, that is stored in and whose history is tracked across one or more of the distributed ledgers 150. The token corresponding to the media file 212 may include metadata associated with the object recorder 206, the object ring-buffer 210, the object file 216, the object server 226, the UGC server 232, the streaming service 220, the content time stamp file 214, and/or the activity feed 224. In some examples, at least some of the actions or activities identified in the activity feed 224, the content time stamp file 214, and/or the object file 216 can be identified in the history of the non-fungible in-game digital asset tracked in the distributed ledgers 150.

FIG. 2B is a conceptual diagram illustrating an example table of various objects and associated events, according to an aspect of the present disclosure. As shown in the example table 250 of FIG. 2B, such object data (e.g., the object file 216) may be associated with event information regarding activity availability change and may be related to other objects with associated object information. Media-object bindings may form telemetry between the objects shown in at least a portion of the streaming media and the streaming media. For example, such object data may be activity data files 251, zone data files 252, actor data files 254, mechanics data files 256, game media data files 258, and other gameplay-related data files.

Such activity data files 251 (e.g., the object file 216) may be categorized as in in progress, open-ended, or competitive. Such activity data files 251 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 251 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

In some examples, an object data file 216, an activity data file 251, a zone data file 252, an actor data file 254, a mechanic data file 256, and/or a game media data file 258 may be converted into a non-fungible in-game digital asset using a non-fungible token, such as the token 400 of FIG. 4, that is stored in and whose history is tracked across one or more of the distributed ledgers 150. The token may include metadata associated with the object data file 216, the activity data file 251, the zone data file 252, the actor data file 254, the mechanic data file 256, and/or the game media data file 258. In some examples, at least some of the events identified in the table 250 as associated with at least one of the object data file 216, the activity data file 251, the zone data file 252, the actor data file 254, the mechanic data file 256, and/or the game media data file 258 can be identified in the history of the non-fungible in-game digital asset tracked in the distributed ledgers 150.

Figure 3:
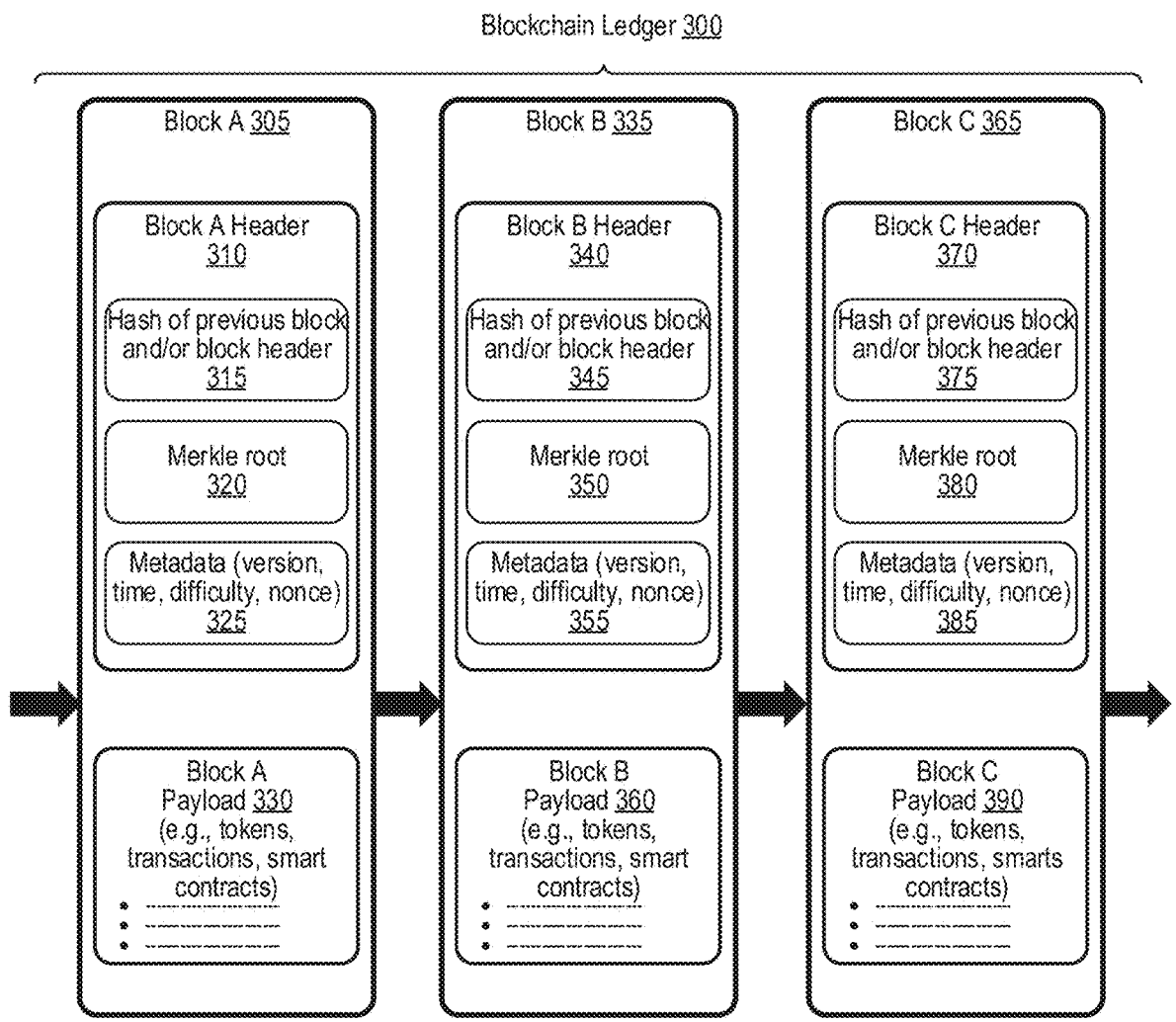
FIG. 3 is a block diagram illustrating three consecutive blocks of a distributed ledger that may be used to track a digital asset associated with a video game, according to an aspect of the present disclosure.

FIG. 3 is a block diagram illustrating three consecutive blocks of a blockchain ledger 300 that may be used to track a digital asset associated with a video game, according to an aspect of the present disclosure. Three blocks of the blockchain ledger 300 are illustrated in FIG. 3, including Block A 305, Block B 335, and Block C 365.

Each block includes a block header 310/340/370 and a list of one or more payloads 330/360/390. In some examples, block header 310/340/370 includes a hash 315/345/375 of the previous block and/or a hash 310/340/370 of the block header of the previous block. For instance, the header 370 of block C 365 includes a hash 375 of the header 340 of block B 335. The header 340 of block B 335 likewise includes a hash 345 of the header 310 of block A 305. The header 310 of block A 305 likewise includes a hash 315 of a header (not pictured) of previous block (not pictured) that is before block A 305 in the blockchain ledger 300. Including the hash of the previous block's header secures the blockchain ledger 300 by preventing modification of any block of the blockchain ledger 300 after the block has been entered into the blockchain ledger 300, as any change to a particular block would cause that block header's hash 315/345/375 in the next block to be incorrect. Further, modification of that block header's hash in the next block would make the next block's header's hash 315/345/375 in the block after the next block incorrect, and so forth. A verifying device can verify that a block has not been modified by computing the hash of block and/or of the block header, then comparing the computed hash to the stored hash 315/345/375 that is stored in the next block. In some distributed ledgers, a block header 310/340/370 can include hashes of multiple previous blocks and/or block headers of multiple previous blocks, as in a distributed acyclic graph (DAG) ledger.

Each block's block header 310/340/370 can include a Merkle root 320/350/380. The Merkle root 320/350/380 can be is generated based on hashes of each of the tokens, transactions, smart contracts, and/or other elements identified in the payload 330/360/390 for that block. Any attempt to modify a payload after the block has been entered would change the Merkle root. A verifying device can verify that the payload(s) 330/360/390 have not been modified by computing the Merkle root, then comparing the computed Merkle root to the stored Merkle root 320/350/380 that is stored in the block header 310/340/370. Changes to the payload 330/360/390 and/or to the Merkle root 320/350/380 would also change the hash for the block and/or for the block header, for which a value is stored in the next block as the hash 315/345/375. Each payload of each block may include one or more tokens (e.g., token 400), one or more transactions, one or more smart contracts, other content, or combinations thereof.

Each block's block header 310/340/370 may also include various elements of metadata, such as a version number for the blockchain ledger platform, a version number for the block itself, a timestamp for verification of each payload, a timestamp for generation of the block, a timestamp for entry of the block into the blockchain ledger 300, a timestamp for request of generation of the block, a difficulty target value (e.g., adjusting difficulty of mining), one or more randomized nonce values, a counter identifying how many nonces have been tried, a title of the blockchain ledger 300, an identifier as to what the blockchain ledger 300 is tracking (e.g., a history of a digital asset associated with a video game), or a combination thereof. Each individual element added can further serve as information that can be verified by a verifying device to identify if the block, and the payload within, is accurate and authorized. The one or more randomized nonce values can serve to further complicate the hashes, improving security.

Each block 305/335/365 of the blockchain ledger 300 also includes a payload 330/360/390. The payload 330/360/390 for each block 305/335/365 can include one or more tokens (e.g., token 400), one or more transactions, one or more smart contracts, one or more other elements, metadata related to any of the previously-listed elements, or combinations thereof. A token may be, for example, a non-fungible token. The token 400 may be an example of a token that is stored in the payload 330/360/390 for a block 305/335/365. As discussed with respect to the token 400, certain parts of the token 400 are stored within the payload 330/360/390 of the blockchain ledger 300, and are thus stored "on-chain." As discussed with respect to the token 400, certain parts of the token 400 include on-chain pointers that point to data outside of the blockchain ledger 300, such as a data structure 140, with such data being stored "off-chain." The payload 330/360/390 of the blockchain ledger 300 may store hashes of off-chain data, so that a verifying device can compute a hash of the off-chain data and compare the computed hash to the stored hash that is stored on-chain to verify that the off-chain data is accurate. In some examples, the payload 330/360/390 includes one or more smart contracts. The block may include the code of the smart contract stored within the payload 330/360/390 of the blockchain ledger 300, thus storing the code on-chain. If the payload 330/360/390 includes a smart contract, the block may include a hash of the code of the smart contract and/or a pointer to an off-chain data structure 140 storing the code of the smart contract, thus storing the code off-chain. In some examples, some of the smart contract's code may be stored on-chain, while some of the smart contract's code may be stored off-chain. In some examples, smart contracts can be used to create, modify, transfer, or otherwise manage tokens. In some examples, the payload 330/360/390 includes transactions. In some examples, transactions may include transfers of tokens from one account to another account. In some examples, transactions may include changes to certain properties of tokens or the associated digital assets, such as changes to ownership, in-game visual appearance, in-game attributes, authorship, licenses to use, rentals, or combinations thereof.

In one illustrative example, a first computing device can store a blockchain ledger including a plurality of blocks. Each of a plurality of computing devices (e.g., in a distributed architecture) also stores a copy of the blockchain ledger. The first computing device can receive a message identifying an intended payload element (e.g., token and/or transaction and/or smart contract). For example, the intended payload element may be a token related to one of the digital assets associated with one or more video games described herein. The first computing device can verify that the intended payload element is valid. In some blockchain ledger 300 implementations, the first computing device can verify that sufficient funds are allocated in order to pay for execution fee charges for the intended payload element, for instance in the form of gas on an Ethereum blockchain ledger. For a transaction, the first computing device can verify whether the transferor has a sufficient quantity of an asset (e.g., whether the transferor owns the token to be transferred) for the transaction to take place. For a smart contract, the first computing device can verify that the smart contract refers to valid accounts that include sufficient quantity of an asset (e.g., token) to execute the smart contract (e.g., to transfer the token), verify that the code of the smart contract can be executed (e.g., does not include syntax errors or other errors), verify that all parties involved in the smart contract have submitted agreement to the terms of the smart contract, or a combination thereof. For a token, the first computing device can verify that the token refers to a valid digital asset, for instance a valid type of digital asset.

The first computing device can generate a hash of a most recent block or block header of the blockchain ledger 300. The first computing device can generate a new block header for a new block. The new block header can include at least the hash of the most recent block or block header of the blockchain ledger 300. The first computing device can generate the new block, the new block including the new block header and a payload with one or more payload elements. The one or more payload elements include at least the intended payload element discussed above (e.g., token, smart contract, transaction). The first computing device can generate a Merkle root based on the payload elements, and include the Merkle root in the new block header. The first computing device can generate a metadata and a nonce value based on the payload elements, and include the metadata and the nonce value in the new block header. The first computing device can append the new block to the plurality of blocks of the blockchain ledger 300 in response to verifying the intended payload element. The first computing device can transmit the new block to the plurality of computing devices that each store the blockchain ledger 300 in response to verifying the intended payload element. Each of the plurality of computing devices also appends the new block to their respective copy of the blockchain ledger 300.

In another illustrative example, a first computing device can store a blockchain ledger 300 including a plurality of blocks. Each of a plurality of computing devices (e.g., in a distributed architecture) also stores a copy of the blockchain ledger 300. The first computing device can receive a UI input identifying an intended payload element (e.g., transaction and/or smart contract). The first computing device can generate a message identifying the intended payload element. The first computing device can retrieve a private key associated with an account corresponding to the first computing device. The first computing device can modify the message by encrypting at least a portion of the message with the private key. The first computing device can transmit the message to the plurality of computing devices other than the first computing device. A second computing device of the plurality of computing devices verifies that the intended payload element is valid, for instance as described in the previous paragraph. The first computing device receives a new block from the second computing device. The new block identifies and/or includes the intended payload element (e.g., in its payload). The first computing device appends the new block to the plurality of blocks of the blockchain ledger 300 at the first computing device.

While FIG. 3 only illustrates three blocks 305/335/365 of the blockchain ledger 300, it should be understood that any blockchain discussed herein may be longer or shorter in that it may have more or fewer than three blocks. Furthermore, it should be understood that another type of distributed ledger, such as a directed acyclic graph (DAG) ledger, can be used instead of, or in addition to, the blockchain ledger 300.

In some examples, a distributed ledger may have a non-linear ledger structure, such as that of a directed acyclic graph (DAG) ledger. Such a DAG ledger may be used instead of or in addition to the blockchain ledger 300 discussed herein. The term "distributed ledger" as used herein should be understood to refer to at least one of a blockchain ledger 300 (as in FIG. 3), a DAG ledger, or a combination thereof. In a DAG ledger, each block header includes the hashes of blocks (or block headers) of a number of other "parent" blocks in the DAG ledger, selected either at random or in some other non-linear manner, rather than just the hash 315/345/375 of a single previous block (or block header) as in the blockchain ledger 300. Where each block header includes multiple hashes corresponding to different parent blocks or their headers, these hashes can be combined together (e.g., using a Merkle root). In some examples, the number of parent blocks of a given block in a DAG ledger is predetermined. In some examples, the number of parent blocks of a given block in a DAG ledger is greater than or equal to a predetermined minimum number of parent blocks, such as a two-parent minimum or a one-parent minimum, meaning that each block has at least the predetermined minimum number of parent blocks. In some cases, each block in a DAG ledger may only identify only a single payload element (e.g., a smart contract, a token 400, a transaction) rather than multiple payload elements, and may therefore forego a Merkle root 320/350/380 of payload elements and/or replace it with a hash of the single payload element. In other implementations, each block may identify multiple payload elements associated with a predetermined time period, and/or may include a Merkle root 320/350/380 of the payload elements. In some examples, DAG ledgers may provide benefits over a blockchain ledger 300, for instance by providing parallelized validation, which may provide higher throughput and/or improved security compared to a blockchain ledger 300.

FIG. 4 is a block diagram illustrating an example token 400 that can be non-fungible and that can represent a digital asset 405 associated with a video game as tracked in a distributed ledger, according to an aspect of the present disclosure. In some examples, the token 400 is a non-fungible token (NFT). In some examples, the token 400 is an ERC721 token, an ERC1155 token, an ERC-20 token, or a combination thereof. In some examples, the token 400 is tracked in a blockchain ledger 300. In some examples, the token 400 is tracked in an Ethereum-based blockchain ledger 300.

The digital asset 405 that the token 400 represents can be an instance of a video game. The digital asset 405 that the token 400 represents can be an in-game digital asset, such as an in-game item, and in-game character (which can be referred in-game actor), an in-game costume for an in-game character, an in-game area, a save file for a game, a configuration for a game, a DLC, an IAP, or a combination thereof. An in-game digital asset can be referred to as an in-game object, as in the object of FIGS. 2A-2B. An in-game character can be referred to as an in-game actor, as in the actor 254 of FIG. 2B. An in-game area can be referred to as an in-game zone, as in the zone 252 of FIG. 2B. In some examples, the in-game character can be a player character controlled by a player, a non-player character (NPC) that the player cannot control (but in some cases can interact with), or some combination thereof. In some examples, an in-game costume can include in-game representations of clothing, outfits, armor, suits, hats, helmets, tops, shirts, jackets, bottoms, pants, skirts, gloves, gauntlets, shoes, boots, fins, eyewear, headwear, handwear, legwear, footwear, jewelry, accessories, another article of clothing, or combinations thereof. In some examples, in-game items can include ranged weapons, melee weapons, potions, food, consumables, armors, shields, ammunition, magic abilities, health-restorative items, mana-restorative items, vehicles, power-ups, extra lives, extra continues, items that modify the attributes of other items (e.g., upgrading a bow and arrow to shoot fire arrows), or combinations thereof.

The digital assets may be video game digital media assets with media representations of one or more moments of gameplay of a video game, such as video clips, images, or audio clips. For instance, an image may be a representation of a single moment of gameplay of a video game. An image can include, for example, a screenshot. A video clip or audio clip can be a representation of a series of consecutive moments of gameplay of a video game. For instance, each moment of the consecutive moments may be represented by an individual video frame of the video clip, or by a particular set of one or more frequencies and amplitudes of sound in the audio clip. Not all moments must be consecutive, as the video clip or audio clip may cut from one set of moments to another, as in a highlight reel. In some examples, an image can be a representation of multiple moments of gameplay of a video game, for example as in a collage of images or a long-exposure-style image that includes a representation of a path along which one or more characters or items moved over one or more durations of time. An image, video clip, and/or audio clip can be captured from a view, perspective, and/or vantage point that a particular player has during gameplay. An image, video clip, and/or audio clip can be captured from a different view, perspective, and/or vantage point than any individual player has.

In some examples, the digital asset can include a save file that saves progress in a video game at a particular point in the progression (e.g., in the story) of the video game. The save file can be identified as an in-game digital asset, since it is usable in-game. The save file can be identified as a video game digital media asset, since it functions as a representation of a moment of gameplay at which the save file was saved.

In some examples, the digital asset can include a "ghost" that can be imported into a game in a way that is visible to a player of the game. The ghost can follow a path of a previous player's gameplay. For example, in a racing game, a ghost can show up in a player's game following a previously-raced route that was raced by the same player at an earlier time, or by another player, at the pace that that route was previously-raced. The ghost can be identified as an in-game digital asset, since it is usable in-game. The ghost can be identified as a video game digital media asset, since it functions as a representation of multiple moments (a duration of time) of the previous player's gameplay.

One or more token smart contracts 445 can be associated with the token 400. For instance, the one or more token smart contracts 445 manage creation (or "minting") of the token 400. The one or more token smart contracts 445 can pay miner devices that create ("mint") a token 400, or batches of tokens, for computing time and resources taken to mint the token 400. The one or more token smart contracts 445 can control how ownership of the token 400 is decided and/or transferred. For instance, the one or more token smart contracts 445 can indicate an initial owner of the token 400 and/or can identify conditions under which ownership automatically transfers, for instance an offer meeting or exceeding an owner-mutable threshold amount. The one or more token smart contracts 445 can indicate conditions under which the token 400 can be rented out or licensed out for use by licensee users/players, for instance an offer meeting or exceeding an owner-mutable threshold amount. The one or more token smart contracts 445 can control conditions under which the token 400 can be burnt, or irreversibly destroyed and/or unlisted. The elements identified as part of the token 400 in FIG. 4—including the token identifier 410, the token unit quantity 415, the token ownership 420, the on-chain immutable metadata 425, the on-chain mutable metadata 430, the on-chain pointers to off-chain media 435, the on-chain pointers to off-chain metadata 440—can be stored as part of the token 400, can be part of the token smart contracts 445, or both. In some examples, the code of the token smart contracts 445 is stored at least partly on-chain. In some examples, the code of the token smart contracts 445 is stored at least partly off-chain at off-chain location(s) such as the data structures 140, with the off-chain location(s) identified by on-chain pointers to the off-chain location(s). The smart contract of FIGS. 11A-11B can be an example of the token smart contracts 445.

The token 400 includes a token identifier 410, which may be referred to as a tokenID. The token identifier 410 can be a unique identifier for the token 400 and/or for the digital asset 405. The token identifier 410 can be used to distinguish the particular instance of the digital asset 405 that the token 400 corresponds to from any other instance of the digital asset 405. In some examples, token identifiers can be created by a computing system creating (or "minting") the token 400 by incremented sequentially compared to token identifiers of previously-created tokens, to ensure that each token identifier is unique.

The token 400 can include a token unit quantity 415. The token unit quantity 415 can identify a quantity of the token 400 that has been or is set to be minted. In some examples, the token unit quantity 415 is one, in which case a single token 400 exists for a given digital asset 405. In some examples the token unit quantity 415 is greater than one. For example, if the token unit quantity 415 is 5, then there are effectively 5 copies of this token 400 representing this unique digital asset 405 that can be owned and/or transferred separately. Those 5 copies may be fungible between one another, or indistinguishable from one another. However, those 5 copies are still non-fungible, unique, distinct, and/or distinguishable relative to any other instance or version or variant of the digital asset 405. The token unit quantity 415 can control how rare the token 400, and by extension the digital asset 405, is. If the token unit quantity 415 is one, then the token 400 and corresponding digital asset 405 is unique. If the token unit quantity 415 is more than one but less than a rarity threshold, then the token 400 and corresponding digital asset 405 is rare. If the token unit quantity 415 is more than one but more than a rarity threshold, then the token 400 and corresponding digital asset 405 is common. In some examples, there may be any number of ranges of rarity, in addition to or instead of unique, rare, and common—such as legendary, very rare, slightly rare, uncommon, and other categories of rarity. In some cases, the token unit quantity 415 can be decided as part of the minting process and/or identified in one of the token smart contracts 445 that manages the minting process.

The token 400 may identify a token ownership 420, which may identify who owns the token 400, and by extension, the corresponding digital asset 405. The token ownership 420 may initially be assigned to a creator of the digital asset 405. The token smart contracts 445 can control rules for transfer of token ownership 420. Token ownership 420 can be transferred as a transaction that is recorded as a payload element in a payload of a block of a blockchain ledger or other distributed ledger.

The token 400 may include on-chain immutable metadata 425. The on-chain immutable metadata 425 can include, for example, a description of the token 400, a description of the digital asset 405 that the token 400 represents, some immutable attributes or properties of the digital asset 405 and/or the token 400, or some combination thereof. The on-chain immutable metadata 425 can use properties of the distributed ledger and/or of the token smart contracts 445 to ensure that the on-chain immutable metadata 425 remains unchanged. In some examples, the on-chain immutable metadata 425 can identify which game the data asset 405 is from, is a representation (e.g., recording) of, or is otherwise related to. In some examples, the on-chain immutable metadata 425 can identify a creator of the digital asset 405 and/or of the token 400. In some examples, the on-chain immutable metadata 425 can identify statistics for the digital asset 405 and/or of the token 400 (e.g., this in-game item provides +2 attack power).

The token 400 may include on-chain mutable metadata 430. The on-chain mutable metadata 430 can include, for example, a description of the token 400, a description of the digital asset 405 that the token 400 represents, some immutable attributes or properties of the digital asset 405 and/or the token 400, or some combination thereof. The on-chain mutable metadata 430 can be mutable or changeable. In some examples, a change to the on-chain mutable metadata 430 can be recorded as a transaction that is recorded as a payload element in a payload of a block of a blockchain ledger or other distributed ledger. In some examples, the on-chain immutable metadata 425 can identify how many times the digital asset 405 has been used in-game and/or how many different players have used the digital asset 405.

The token 400 may include on-chain pointers to off-chain media 435. The off-chain media can include the digital asset 405 and/or one or more representations of the digital asset 405. For example, the off-chain media can include one or more images, 3D models, video clips, audio clips, or combinations thereof. These types of media can require a lot of storage space to store, and can thus be expensive to store on-chain in terms of execution fee charges (such as gas on an Ethereum blockchain ledger). Thus, it may be more efficient to store this media off-chain in one or more off-chain locations, such as the data structures 140. The on-chain pointer can include a uniform resource identifier (URI), such as a uniform resource locator (URL), that points to the one or more network locations of the one or more off-chain locations. In some examples, hashes can be stored of the off-chain media, so that a verifying device can compute a hash of the off-chain media and compare the computed hash to the stored hash that is stored on-chain to verify that the off-chain media is accurate. In some examples, the off-chain media may be immutable. In some examples, the off-chain media may be mutable. In some examples, the pointer may be immutable. In some examples, the pointer may be mutable.

The token 400 may include on-chain pointers to off-chain metadata 440. The off-chain metadata 430 can include, for example, a description of the token 400, a description of the digital asset 405 that the token 400 represents, some immutable attributes or properties of the digital asset 405 and/or the token 400, or some combination thereof. Some digital assets 405 and/or tokens 400 may require significant quantities of metadata, which can require a lot of storage space to store, and can thus be expensive to store on-chain in terms of execution fee charges (such as gas on an Ethereum blockchain ledger). Thus, it may be more efficient to store this metadata off-chain in one or more off-chain locations, such as the data structures 140. The on-chain pointer can include a uniform resource identifier (URI), such as a uniform resource locator (URL), that points to the one or more network locations of the one or more off-chain locations. In some examples, hashes can be stored of the off-chain metadata, so that a verifying device can compute a hash of the off-chain metadata and compare the computed hash to the stored hash that is stored on-chain to verify that the off-chain metadata is accurate. In some examples, the off-chain metadata may be immutable. In some examples, the off-chain metadata may be mutable. In some examples, the pointer may be immutable. In some examples, the pointer may be mutable.

Figure 5:
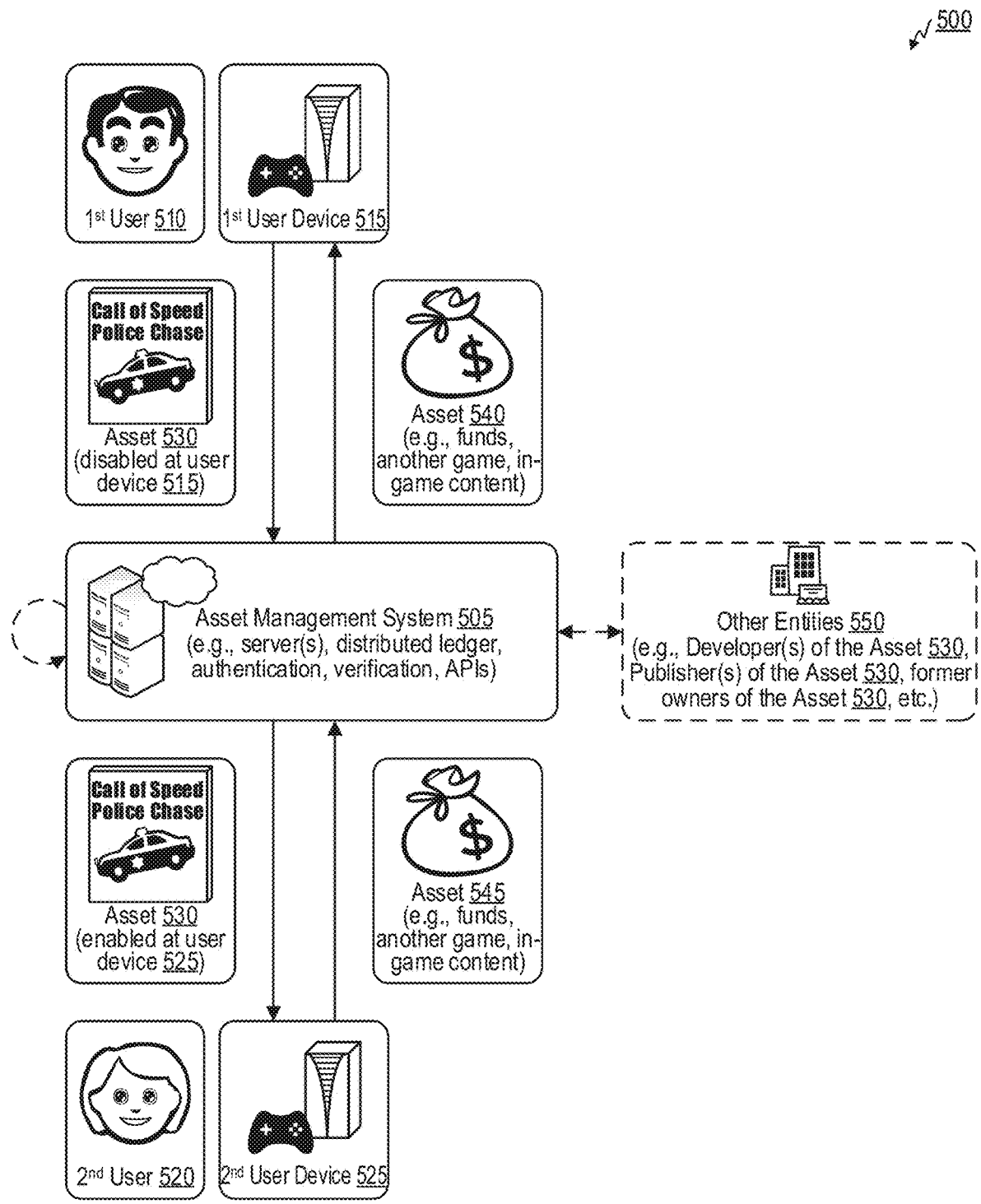
FIG. 5 is a block diagram illustrating a transfer of usability of an asset from a first user device to a second user device, according to an aspect of the present disclosure.

FIG. 5 is a block diagram 500 illustrating a transfer of usability of an asset 530 from a first user device 515 to a second user device 525. The first user device 515 is associated with a first user 510, while the second user device 525 is associated with a second user 520. The first user device 515 and the second user device 525 can each be examples of the user device 130, the console 228, the entertainment systems 1300, or a combination thereof. An asset management system 505 can manage the transfer of usability of the asset 530 from the first user device 515 to the second user device 525. The asset management system 505 can include the interactive content servers 110, the platform servers 120, the data structures 140, the distributed ledgers 150, the APIs 160, one or more user devices 130, the distributed network 105, the console 228, the entertainment systems 1300, or a combination thereof.

The asset management system 505 is communicatively coupled to the first user device 515 and the second user device 525, for instance through one or more networks. In some examples, the asset management system 505 has a level of control over the first user device 515 and the second user device 525, for instance having the ability to enable or disable a digital entitlement (e.g., usability of a certain digital asset) at the first user device 515 and/or the second user device 525. The asset management system 505 can use this to manage a transfer of usability of the asset 530.

The first user device 515 may have obtained an asset 530, may have the asset 530, and may have authorization to use the asset 530. For instance, the first user device 515 may have purchased the asset 530 from a software repository (e.g., of the asset management system 505) or from a third user device. In the example illustrated in FIG. 5, the asset 530 is a digital instance of a video game titled "Call of Speed: Police Chase." The asset management system 505 may receive a request from the first user device 515 indicating that the first user 510 wishes to sell, rent, loan, license, and/or transfer the asset 530, and/or the authorization to use the asset 530. The transfer may be permanent, as in a sale, or temporary, as in a rental or loan.

In some examples, the request may identify the second user 520 and/or the second user device 525 associated with the second user 520. In some examples, the asset management system 505 may identify the second user 520 and/or the second user device 525 associated with the second user 520, for example as part of a matchmaking process such as the matchmaking process illustrated in FIG. 6. Before the transfer of usability of the asset 530, the second user device 525 does not have authorization to use the asset 530. To transfer usability of the asset 530 from the first user device 515 to the second user device 525, the asset management system 505 can disable authorization to use the asset 530 at the first user device 515, and can enable authorization to use the asset 530 at the second user device 525. After the transfer, the second user device 525 has authorization to use the asset 530, and the first user device 515 no longer has authorization to use the asset 530.

The asset management system 505 can manage one or more transfers of other assets corresponding to the transfer of usability of the asset 530 from the first user device 515 to the second user device 525. For instance, the asset management system 505 can receive a transfer of an asset 545 from the second user device 525 and/or the second user 520. The asset management system 505 can transfer an asset 540 to the first user device 515 and/or the first user 510. In some examples, the asset 540, and/or the asset 545, include fiat currency funds, platform-specific funds (e.g., gift cards and/or store points), another instance of the same video game as in the asset 530, an instance of a different video game than in the asset 530, in-game content for the same video game as in the asset 530, in-game content for a different video game than in the asset 530, or a combination thereof. In some examples, the asset 540 includes at least a portion of the asset 545. In some examples, the asset 545 includes at least a portion of the asset 540.

For instance, in one illustrative example, the asset management system 505 can receive a request from the first user device 515 to transfer the asset 530, can disable authorization to use the asset 530 at the first user device 515, and can provide the asset 540 (e.g., a predetermined amount of funds) to the first user device 515 and/or the first user 510 in exchange for the authorization to use the asset 530. The asset management system 505 can then, at a later time, identify the second user 520 and/or second user device 525, for instance by receiving a request from the second user 520 and/or second user device 525 seeking to acquire authorization to use the asset 530, by sending a query to the second user 520 and/or second user device 525 to inquire as to whether the second user 520 would be interested in acquiring authorization to use the asset 530, and/or via the matchmaking process of FIG. 6. The second user 520 and/or second user device 525 can provide the asset 545 (e.g., a second predetermined amount of funds) to the asset management system 505, and the asset management system 505 can enable authorization to use the asset 530 at the second user device 525 in exchange. In some examples, the asset 545 can include a greater amount of funds than the asset 540. In some examples, a portion of the asset 545 (e.g., a portion of the amount of funds of the asset 545) can be provided to other entities 550 than the two users or their devices, such as one or more developers of the asset 530, one or more publishers of the asset 530, one or more former owners of the asset 530, the asset management system 505 itself, or a combination thereof.

Figure 6:
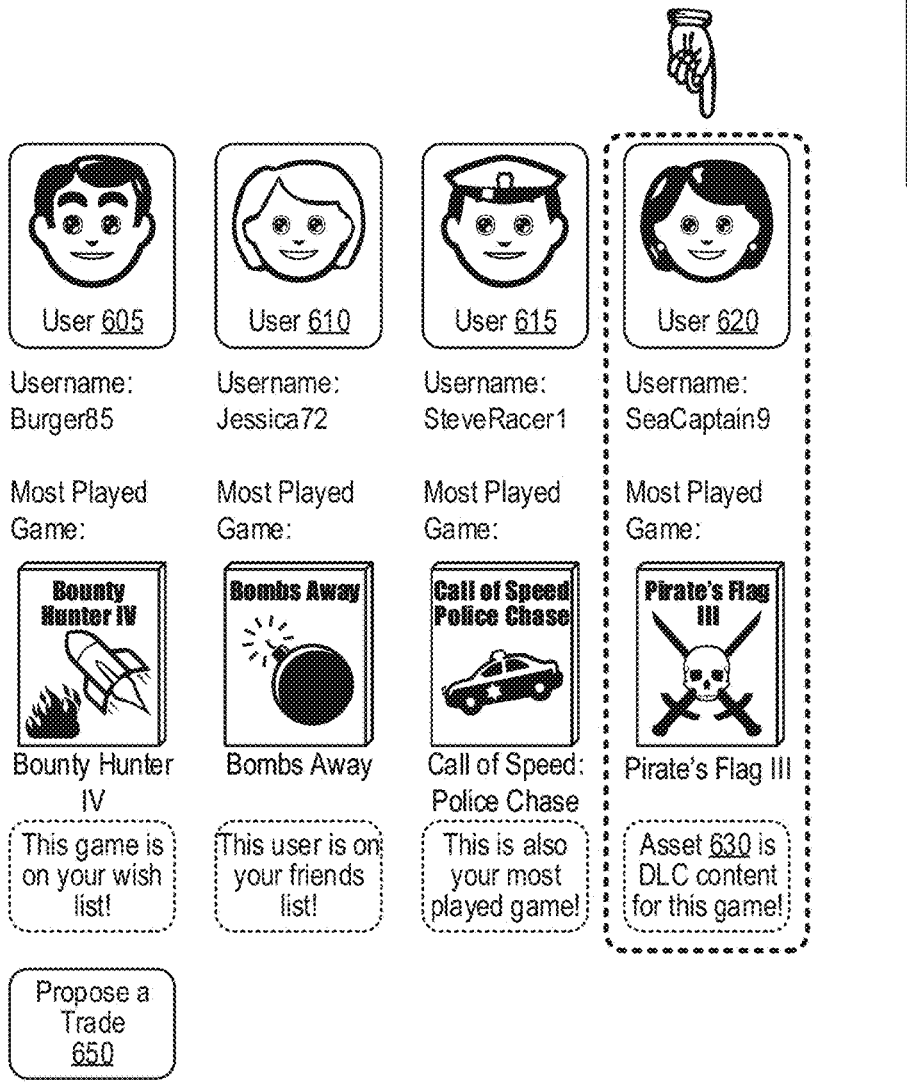
FIG. 6 is a conceptual diagram illustrating an example of an interface for matchmaking between users for transferring usability of an asset, according to an aspect of the present disclosure.

In another illustrative example, the asset management system 505 can receive a request from the first user device 515 to transfer the asset 530, causing the asset management system 505 to initiate a matchmaking process to identify the second user 520 and/or the second user device 525, such as the matchmaking process illustrated in FIG. 6. Through the matchmaking process, the asset management system 505 can provide information about the second user 520 and/or the second user device 525 to the first user 510 and/or the first user device 515. Through the matchmaking process, the asset management system 505 can provide information about the first user 510 and/or the first user device 515 to the second user 520 and/or the second user device 525. In some examples, the first user 510 and/or the first user device 515 can select the second user 520 and/or the second user device 525 to be the recipient of the authorization to use the asset 530, after which the asset management system 505 can automatically perform the transfer of authorization to use the asset 530 from the first user device 515 to the second user device 525 upon provision of the asset 545 by the second user 520 and/or the second user device 525. In some examples, the second user 520 and/or the second user device 525 can select the first user 510 and/or the first user device 515 to be the seller from whom they choose to purchase the authorization to use the asset 530, after which the asset management system 505 can automatically perform the transfer of authorization to use the asset 530 from the first user device 515 to the second user device 525 upon provision of the asset 545 by the second user 520 and/or the second user device 525. In some examples, the asset management system 505 can automatically perform the transfer of authorization to use the asset 530 from the first user device 515 to the second user device 525 as soon as the asset management system 505 identifies both the second user 520 and/or the second user device 525 and the first user 510 and/or the first user device 515, and the asset 545 is provided by the second user 520 and/or the second user device 525. In some examples, once the asset management system 505 receives the asset 545, the asset management system 505 transfers at least a portion of the asset 545 to the first user 510 and/or the first user device 515 as the asset 540, and in some cases another portion of the asset 545 to the other entities 550. In some examples, the management platform 505 does not store the asset 545, but immediately conveys at least a portion of the asset 545 over to the first user 510 and/or the first user device 515 as the asset 540, and in some cases another portion of the asset 545 to the other entities 550. In some examples, the asset 540 is the asset 545. In some cases, the asset 540 is less than (e.g., includes fewer funds than) the asset 545. In some cases, the asset 540 is greater than (e.g., includes more funds than, or additional other asset(s)) than the asset 545, with the additional asset(s) provided by the asset management system 505 and/or the other entities 550, for instance to encourage use of the asset management system 505 for such transfers.

In some examples, the first user 510 and/or the first user device 515 may also provide additional asset(s) along with the asset 530. For instance, the first user 510 and/or the first user device 515 may provide an amount of funds to the asset management system 505. The additional asset(s), in some examples, can be provided from the asset management system 505 to the other entities 550.

In some examples, the asset management system 505 includes a distributed ledger, such as a blockchain ledger 300. In some examples, transactions recording the transfers of the asset 530, the asset 540, and/or the asset 545 can be stored by the asset management system 505 in the distributed ledger. In some examples, smart contracts corresponding to the transfers of the asset 530, the asset 540, and/or the asset 545 can be stored by the asset management system 505 in the distributed ledger, and can be executed to perform the transfers of the asset 530, the asset 540, and/or the asset 545 once certain conditions are met, such as transfer of the asset 530 being automatically executed upon verification that the transfer(s) of the asset 540 and/or the asset 545 are complete. In some examples, tokens corresponding to the asset 530, the asset 540, and/or the asset 545 can be stored by the asset management system 505 in the distributed ledger and/or transferred by the asset management system 505 using the distributed ledger.

In some examples, the asset management system 505 can change what content is, and/or can be, stored on the first user device 515 and/or the second user device 525 as a result of the transfer. For example, as part of disabling the authorization to use the asset 530 at the first user device 515, the asset management system 505 can delete the asset 530 from the first user device 515, or cause the first user device 515 to delete the asset 530. As part of enabling the authorization to use the asset 530 at the second user device 525, the asset management system 505 can send the asset 530 to the second user device 525, or cause the second user device 525 to download the asset 530, for example from a software repository. In some examples, the authorization to use the asset 530 also includes an authorization to download the asset 530 from the software repository of the asset management system 505.

In some examples, the asset management system 505 is tied to a managing assets, transfers, and/or user devices related to a specific platform or ecosystem, such as the Sony® PlayStation® platform or ecosystem. In some examples, the asset management system 505 can manage assets, transfers, and/or user devices of multiple platforms or ecosystems. For instance, the first user 510 can trade an instance of a video game for PC (e.g., as the asset 530) for a different instance of the same video game for a Sony® PlayStation® console (e.g., as the first user device 515) of the first user 510 (e.g., as the asset 540 and/or the asset 545).

FIG. 6 is a conceptual diagram illustrating an example of an interface 600 for matchmaking between users for transferring usability of an asset 630. In the exemplary illustration of FIG. 6, the asset 630 is in-game content, specifically downloadable content (DLC), for a video game titled "Pirate's Flag III." The asset 630 is being sold by a user 640 with the username BugHero62.

In the matchmaking process illustrated in FIG. 6, the asset management system 505 identifies various users that may be interested in purchasing the asset 630 from the user 640, including a user 605, a user 610, a user 615, and a user 620. Each of the various users identified by the asset management system 505 include at least one characteristic in common with the user 640. For instance, the user 605, whose username is Burger85, shares a game of interest characteristic with the user 640, titled "Bounty Hunter IV." In particular, the asset management system 505 identifies that the "Bounty Hunter IV" is the most played game for user 605, and also appears on a wish list for the user 640. A "propose a trade" button 650 appears beside the entry for the user 605, allowing the user 640 to propose a trade between the asset 630 and the "Bounty Hunter IV" game.

The user 610, whose username is Jessica72 and whose most played game is "Bombs Away," is identified by the asset management system 505 as sharing a friend circle characteristic, as the user 610 belongs to the user 640's friends list. The user 615, whose username is SteveRacer1 and whose most played game is "Call of Speed: Police Chase," is identified by the asset management system 505 as sharing a most played game characteristic, as the game "Call of Speed: Police Chase" is also the user 640's most played game. The user 620, whose username is SeaCaptain9 and whose most played game is "Pirate's Flag III," is identified by the asset management system 505 as sharing a game ownership characteristic, as the user 620 and user 640 both own the game "Pirate's Flag III," with this being particularly relevant because the asset 630 is in-game content (DLC) for the game "Pirate's Flag III." The interface 600 illustrated in FIG. 6 shows a selection pointer highlighting the user 620, indicating that the user 640 is interested in selling the asset 630 to the user 620, for instance based on the shared game ownership characteristic between the user 620 and the user 640.

FIG. 7 is a conceptual diagram illustrating an example of an interface 700 for purchasing authorization to use a digital asset 630 associated with a video game. The interface 700 is an example interface for a potential purchaser of the asset 630, such as the second user 520, the second user device 525, the user 605, the user 610, the user 615, and/or the user 620. The interface 700 includes asset information 705 that identifies the asset 630 as being in-game content, specifically downloadable content (DLC) titled "Premium Ships" for a video game titled "Pirate's Flag III." The asset information 705 also identifies that the seller (e.g., the user 640) has requested a price of $9.99 for the asset 630, that the original "new" price for the asset 630 was $14.99, and that the average "used" price for the asset 630 is $10.99. The interface 700 includes buttons allowing the purchasing user to buy the asset 630 now at $9.99, to bid a different amount (such as the $5.99 amount entered into the bid field), to propose a trade for the asset 630 (e.g., in exchange for a different game or in-game content element), or to add the asset 630 to the purchasing user's wish list. If the purchasing user buys the asset 630 now at $9.99, the $9.99 can be an example of the asset 545, and the transfer can proceed immediately. In some examples, the asset management system 505 can manage bids for the asset 630, for instance automatically selecting the highest bidder at the end of a bid time period. The winning bid can then be an example of the asset 545.

The interface 700 also includes seller information 710 identifying information about the user 640 who is selling the asset 630. For example, the seller information 710 identifies that the username for the user 640 is BugHero62, that average feedback (e.g., from other purchasing users who have purchased from the user 640 using the asset management system 505) for the user 640 is 97.9% positive, that the user 640 is located in North America, that the user 640's most played games include "Call of Speed: Police Chase" and "Pirate's Flag III," and that the user 640 and the purchasing user have user 610 Jessica72 as a friend in common. The interface 700 includes a button to contact the seller, which allows the asset management system 505 to open a channel of communication between the user 640 and the purchasing user. The interface 700 includes a button to see other assets being sold by the user 640, which can allow the asset management system 505 to identify to the purchasing user other assets being sold by the user 640 other than the asset 630.

FIG. 8 is a conceptual diagram illustrating an example of an interface 800 for appraising a value of a digital asset 630 associated with a video game. The interface 800 of FIG. 8 may be an interface for a seller user, such as the user 640. The interface 800 identifies some of the same asset information 705 as the interface 700 of FIG. 7, such as the original "new" price for the asset 630 being $14.99, and the average "used" price for the asset 630 being $10.99. This information can be used for appraisal of a price requested by the user 640, for instance to identify whether the price requested by the user 640 is average, lower than average, or higher than average. The interface 800 includes a "price requested" field 805 where the user 640 can enter a price that the user 640 wishes to sell the asset 630 for. In some examples, the price requested can be a "buy now" price at which a purchasing user can immediately buy the asset 630 without undergoing a bidding process. In some examples, the price requested can be a minimum bid that a purchasing user can place for the asset 630, with the asset management system 505 still managing the bidding process after placement of the bid. The interface 800 includes a price of $9.99 in the "price requested" field 805, and includes an alert indicating that this $9.99 price is lower than the average "used" price for the asset 630 of $10.99.

The interface 800 also includes a graph 840 of the "new" price of the asset 630 over time, for instance from an official software repository or marketplace. The graph 840 shows that the "new" price of the asset 630 has fluctuated over time, for instance based on various sales, price drops, price hikes, and the like. The interface 800 includes a graph 845 of the average "used" price of the asset 630 over time, for instance based on various transfers such as the transfer of FIG. 5 that are managed by the asset management system 505. The graph 845 shows that the average "used" price of the asset 630 has fluctuated over time, somewhat similarly to the "new" price of the asset 630 over time in the graph 840, but somewhat independently as well. Both the graph 840 and the graph 845 include a dashed horizontal line representing the $9.99 price requested by the user 640.

Figure 9:
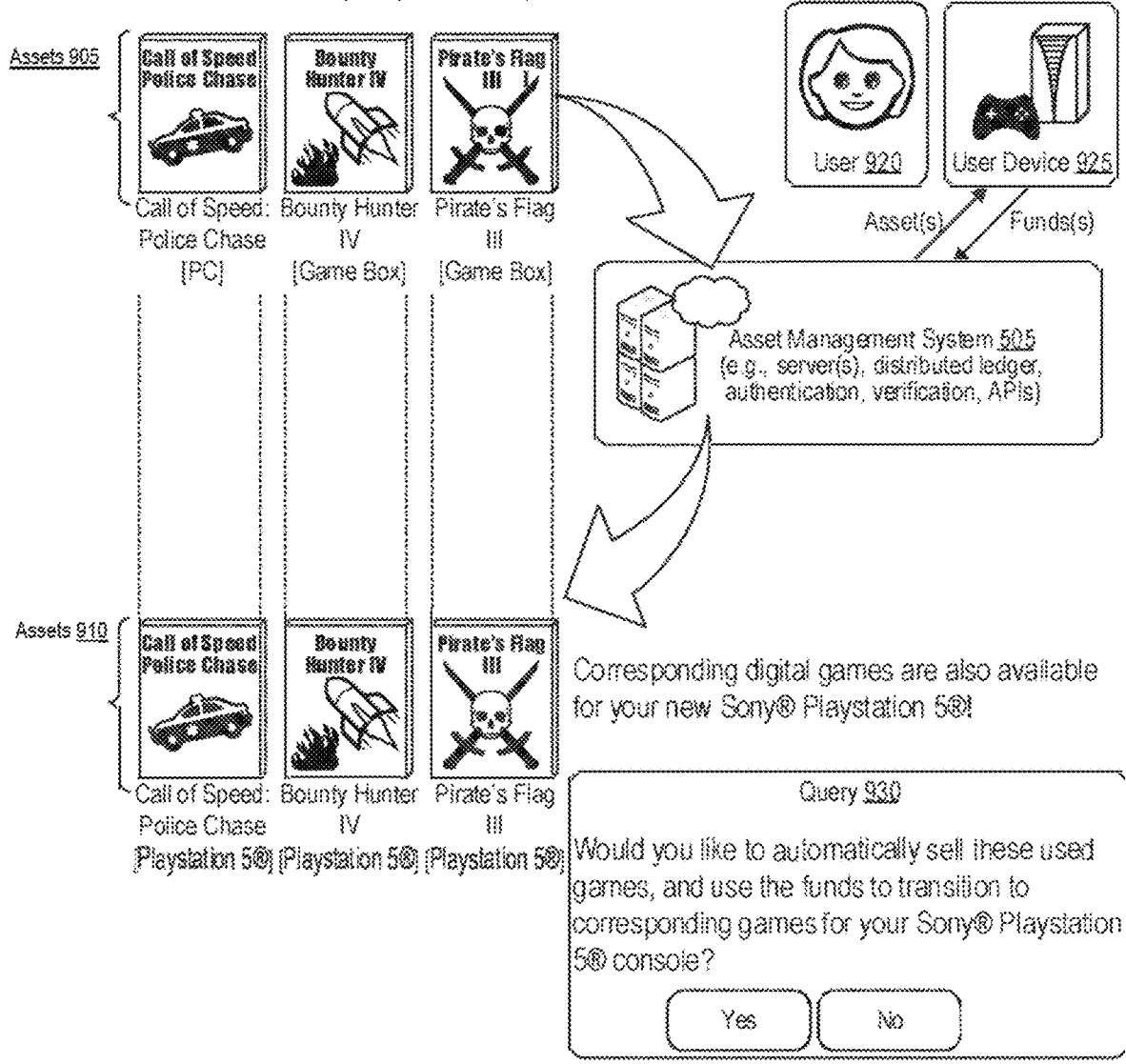
FIG. 9 is a conceptual diagram illustrating an example of an interface for onboarding a user onto a platform and assisting the user with conversion of video game assets associated with other platforms to corresponding video game assets associated with the platform, according to an aspect of the present disclosure.

FIG. 9 is a conceptual diagram illustrating an example of an interface 900 for onboarding a user onto a platform and assisting the user with conversion of video game assets 905 associated with other platforms to corresponding video game assets 910 associated with the platform. As noted previously, in some examples, the asset management system 505 can manage assets, transfers, and/or user devices of multiple platforms or ecosystems. The interface 900 identifies video game assets 905 that a user owns on other platforms or ecosystems, such as PC or Game Box platforms or ecosystems. The video game assets 905 include an instance of video game "Call of Speed: Police Chase" for the PC platform, an instance of video game "Bounty Hunter IV" for the Game Box platform, and an instance of video game "Pirate's Flag III" for the Game Box platform. The asset management system 505, which in the example of FIG. 9 is associated with the Sony® PlayStation® platform or ecosystem, identifies corresponding instances of the same video games that are available for the Sony® PlayStation® platform or ecosystem as the video game assets 910. For instance, in the interface 900, the asset management system 505 identifies an instance of video game "Call of Speed: Police Chase" for the Sony® PlayStation® 5 platform, an instance of video game "Bounty Hunter IV" for the Sony® PlayStation® 5 platform, and an instance of video game "Pirate's Flag III" for the Sony® PlayStation® 5 platform.

The interface includes a query 930 asking the user whether the user would like to automatically sell the video game assets 905 for the other platforms and use the funds from these sales to go toward the video game assets 910 for the Sony® PlayStation® platform that the user is joining. The query 930 includes a "yes" button that causes the asset management system 505 to sell the video game assets 905 for the other platforms to one or more other users and/or user devices, such as the user 920 and/or user device 925, as discussed with respect to FIG. 5. For instance, the video game assets 905 can be examples of the asset 530, the user 920 can be an example of the second user 520, and the user device 925 can be an example of the second user device 525. Funds from the user 920 and/or the user device 925 can be examples of the asset 540 and/or the asset 545, and can be automatically applied to purchase of the video game assets 910 by the asset management system 505. In some examples, the asset management system 505 can purchase the video game assets 910 as new video game assets from an official software repository or marketplace. In some examples, the asset management system 505 can purchase the video game assets 910 as used video game assets from seller users and/or seller user devices. In such examples, the video game assets 910 can be examples of the asset 530, the seller users can be examples of the second user 520, and the seller user device can be examples of the second user device 525. The query 930 includes a "no" button that does not perform the suggested transfer of the video game assets 905 for the video game assets 910.

Figure 10:
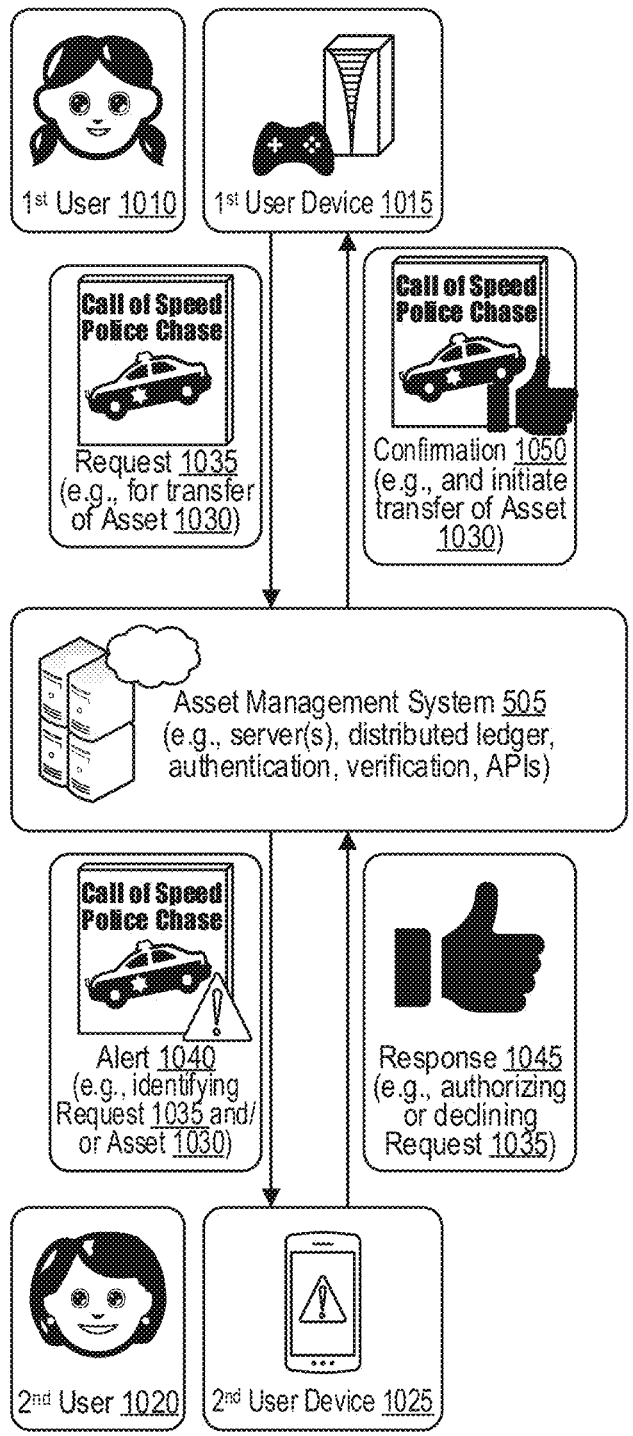
FIG. 10 is a block diagram illustrating an authorization process managing user authorization of a transfer of usability of an asset, according to an aspect of the present disclosure.

FIG. 10 is a block diagram 1000 illustrating an authorization process managing user authorization of a transfer of usability of an asset. The first user device 1015 is associated with a first user 1010, while the second user device 1025 is associated with a second user 1020. The first user device 1015 and/or the first user 1010 submits a request 1035 for transfer of authorization for use of an asset 1030 to the asset management system 505. In some examples, the request 1035 is a request to transfer authorization to use the asset 1030 away from the first user device 1015. In such examples, the first user 1010 and the first user device 1015 are examples of the first user 510 and the first user device 515, respectively. In some examples, the request 1035 is a request to transfer authorization to use the asset 1030 the first user device 1015 from another user device. In such examples, the first user 1010 and the first user device 1015 are examples of the second user 520 and the second user device 525, respectively.

The second user 1020 can be a parent, guardian, supervisor, co-worker, friend, and/or family member of the first user 1010. The asset management system 505 identifies settings and/or rules associated with the first user 1010, the first user device 1015, the second user 1020, the second user device 1025, and/or the asset 1030. The settings and/or rules can identify conditions under which the second user 1020 and/or the second user device 1025 must provide authorization before a requested transfer can be performed by the asset management system 505. If the conditions are met, the asset management system 505 sends an alert to the second user device 1025 of the second user 1020. The second user device 1025 can be an example of the user device 130, the console 228, the entertainment systems 1300, or a combination thereof. In some examples, the second user device 1025 is a smart phone, a mobile handset, and/or a wireless communication device. The second user device 1025 can display the alert 1040. The alert 1040 can identify the request 1035, the asset 1030, the details of the requested transfer of the asset 1030, further information about the asset 1030 (e.g., type of game or in-game content), or a combination thereof. For example, the alert 1040 can indicate an age rating for the asset 1030, such as an Entertainment Software Rating Board (ESRB) rating for the asset 1030. In some examples, the alert 1040 can indicate user ratings and/or reviews for the asset 1030.

If the asset 1030 is an asset that the first user device 1015 is authorized to use and that the request 1035 seeks to transfer that authorization to use away from the first user device 1015, then the alert 1040 may identify a usage history of the asset 1030 on the first user device 1015, for instance to ensure that the first user 1010 is not trying to sell a favorite game or piece of in-game content. The alert 1040 can identify a price that the first user 1010 seeks to sell, rent, license, or otherwise transfer the asset 1030 for, such as the price requested in the price requested field 805. The alert 1040 can identify any of the asset information 705 and/or the seller information 710 in the interface 700 and/or the interface 800.

The second user device 1025 can send a response 1045 to the asset management system 505. The response 1045 is responsive to the alert 1040, and indicates whether the user 1020 authorizes or declines the request 1035. If the response 1045 indicates that the user 1020 authorizes the request 1035, then the asset management system 505 can perform the transfer requested in the request 1035 as discussed with respect to the transfer of FIG. 5, and can send a confirmation 1050 to the first user 1010 and/or the first user device 1015 indicating that the response 1045 is received and that the response 1045 is an authorization. If the response 1045 indicates that the user 1020 declines the request 1035, then the asset management system 505 can cancel and/or prohibit the transfer requested in the request 1035, and can send a confirmation 1050 to the first user 1010 and/or the first user device 1015 indicating that the response 1045 is received and that the response 1045 declines the request 1035.

Figure 11A:
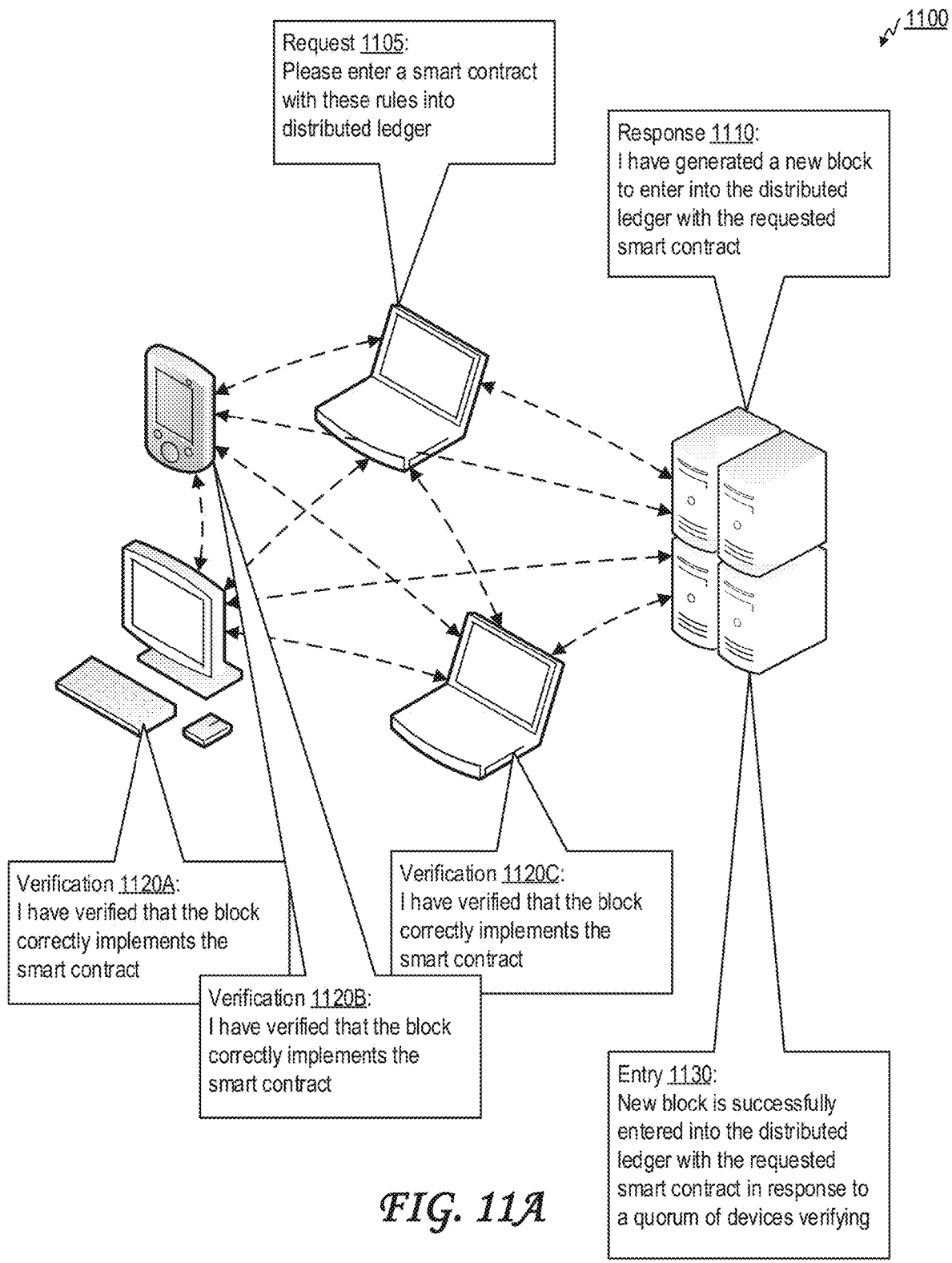
FIG. 11A is a conceptual diagram illustrating generation of a smart contract and entry of the smart contract into a distributed ledger, according to an aspect of the present disclosure.

FIG. 11A is a conceptual diagram 1100 illustrating generation of a smart contract and entry of the smart contract into a distributed ledger, according to an aspect of the present disclosure. The distributed computing architecture includes multiple computing systems (referred to here as computers), which may be entertainment systems 1300, that store and modify the distributed ledger. A first computer submits a request 1105 requesting entry of a smart contract with particular rules into distributed ledger. A second computer submits a response 1110 indicating that the second computer has generated a new block to enter into the distributed ledger with the requested smart contract. Third, fourth, and fifth computers submit verification 1120A-1120C indicating that they have verified that the block correctly implements the smart contract, that the code of the smart contract can be executed (e.g., does not include syntax errors or other errors), that all parties involved in the smart contract have submitted agreement to the terms of the smart contract, that on-chain pointers correctly point to valid off-chain smart contract code, and/or that sufficient funds are allocated in order to pay for execution fee charges for the intended payload element. The second computer submits and entry confirmation indicating that the new block is successfully entered into the distributed ledger with the requested smart contract in response to a quorum of devices verifying.

A similar process to the process illustrated in FIG. 11A may be used to enter tokens, with the corresponding verification 1120A-1120C verifying, for instance, that the token refers to a valid type of digital asset, that on-chain pointers correctly point to valid off-chain media or metadata, and/or that sufficient funds are allocated in order to pay for execution fee charges for the intended payload element. A similar process to the process illustrated in FIG. 11A may be used to enter transaction, with the corresponding verification 1120A-1120C verifying, for instance, whether the transferor has a sufficient quantity of an asset (e.g., whether the transferor owns the token to be transferred) for the transaction to take place and/or that sufficient funds are allocated in order to pay for execution fee charges for the intended payload element.

Figure 11B:
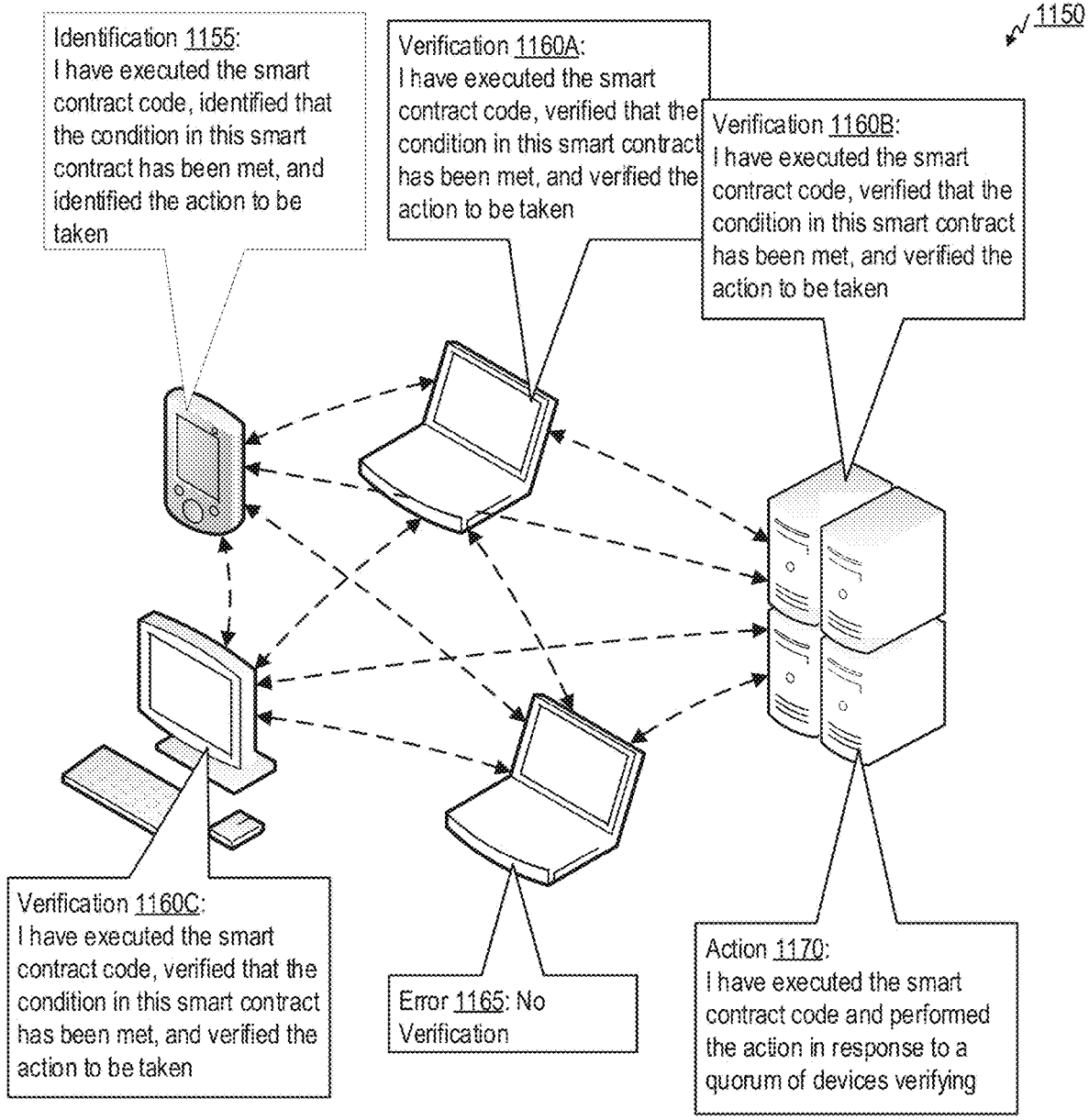
FIG. 11B is a conceptual diagram illustrating execution of a smart contract, according to an aspect of the present disclosure.

FIG. 11B is a conceptual diagram 1150 illustrating execution of a smart contract, according to an aspect of the present disclosure. A first computer submits an identification 1155 that the first computer has executed the smart contract code, identified that the condition in this smart contract has been met, and identified the action to be taken. Second, third, and fourth computers submit verifications 1110A-1110C that identify that the second, third, and fourth computers have executed the smart contract code, verified that the condition in this smart contract has been met, and verified the action to be taken. A fifth computer indicates an error 1115 with no verification. The third computer indicates an action 1120, indicating that the third computer has executed the smart contract code and performed the action in response to a quorum of devices verifying (e.g. the verifications 1110A-1110C).

Figure 12:
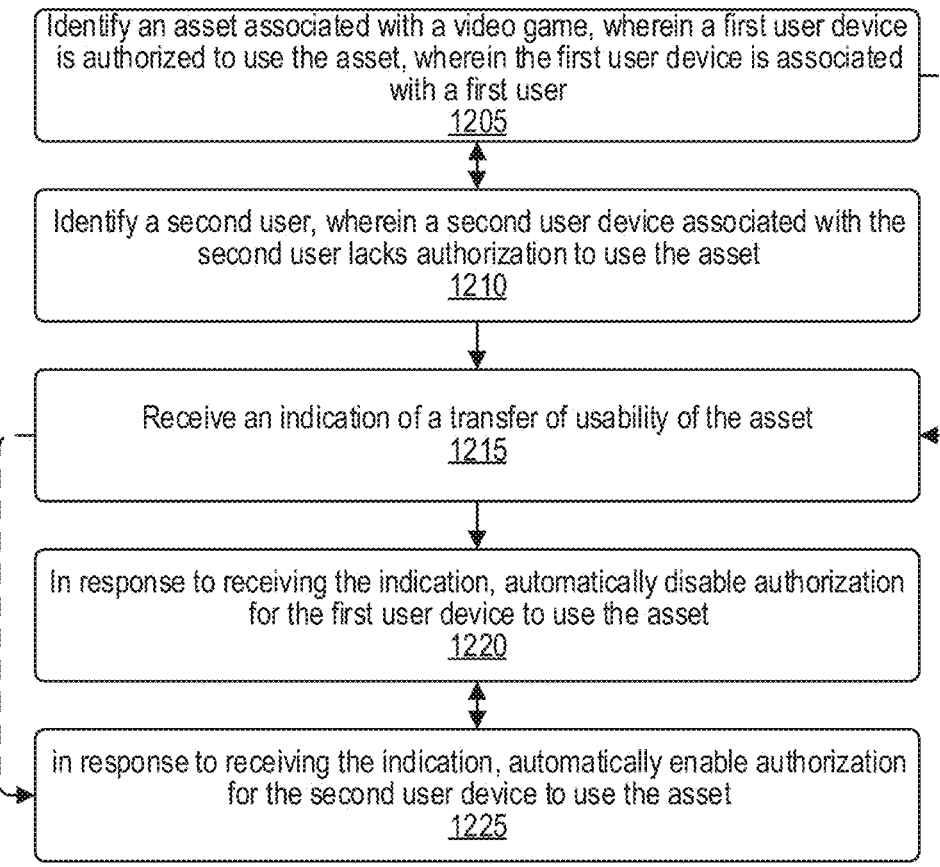
FIG. 12 is a flow diagram illustrating operations for authorization reconfiguration for digital asset usability, according to an aspect of the present disclosure.

FIG. 12 is a flow diagram illustrating operations 1200 for authorization reconfiguration for digital asset usability, according to an aspect of the present disclosure. At least a subset of the operations 1200 can be performed by an authorization management system, which may include, for example, the network environment 100, the one or more interactive content servers 110, the one or more platform servers 120, the one or more user devices 130, the one or more data structures 140, one or more distributed ledgers 150, the network environment 200, the console 228, the one or more servers 218, the blockchain ledger 300, the asset management system 505, the first user device 515, the second user device 525, a user device of any of the users 605-620, a user device of the user 640, the user device 925, the first user device 1015, the second user device 1025, the computing devices of FIGS. 11A-11B, the entertainment system 1300, a system, an apparatus, a non-transitory computer readable storage medium having embodied thereon a program to be executed by a processor, or a combination thereof.

At operation 1205, the authorization management system is configured to, and can, identify an asset associated with a video game. A first user device is authorized to use the asset. The first user device is associated with a first user. Examples of the asset include the media filed 202, the object file 216, the activity 251, the zone 252, the actor 254, the mechanic 256, the game media 258, an asset identified in the payload 330, an asset identified in the payload 360, an asset identified in the payload 390, the token 400, the asset 530, the asset 630, the video game assets 905, the video game assets 910, the asset 1030, an asset whose transfer is controlled using the smart contract(s) of FIGS. 11A-11B, or a combination thereof. Examples of the first user include the first user 510, the second user 520, the user 605, the user 610, the user 615, the user 620, the user 640, the user 920, the first user 1010, the second user 1020, or a combination thereof. Examples of the first user device include the user devices 130, the console 228, the first user device 515, the second user device 525, the user device 925, the first user device 1015, the second user device 1025, the computing devices of FIGS. 11A-11B, the entertainment system 1300, or a combination thereof.

In some examples, the asset is an instance of the video game, such as any of the video games illustrated in FIGS. 5-10.

In some examples, the asset includes in-game content associated with the video game. The in-game content is usable by a player of the video game within the video game during gameplay of the video game by the player. The player may be, for example, the first user of operation 1205, before the transfer of operations 1215-1220. The player may be, for example, the second user of operation 1210, after the transfer of operations 1215-1220.

At operation 1210, the authorization management system is configured to, and can, identify a second user. A second user device associated with the second user lacks authorization to use the asset. Examples of the second user include any of the example users listed above as examples of the first user of operation 1205. Examples of the second user device include any of the example users listed above as examples of the first user device of operation 1205. In some examples, the authorization management system identifies the second user through a matchmaking process as illustrated in FIG. 6.

In an illustrative example, the first user of operation 1205 is an example of the first user 510, the first user device of operation 1205 is an example of the first user device 515, the second user of operation 1210 is an example of the second user 520, and the second user device of operation 1210 is an example of the second user device 525.

In some examples, the authorization management system is configured to, and can, identify a characteristic of the first user. The authorization management system can identify a plurality of characteristics of a plurality of users. The plurality of users includes the second user. The authorization management system can identify from among the plurality of characteristics of the plurality of users, that the second user also shares the characteristic of the first user. In such examples, identifying the second user in operation 1210 is based on the characteristic being shared by the first user and the second user. Examples of the characteristics include the characteristics identified in the matchmaking process and interface 600 of FIG. 6.

At operation 1215, the authorization management system is configured to, and can, receive an indication of a transfer of usability of the asset.

In some examples, the indication of the transfer of usability of the asset includes receipt of a confirmation for the transfer from the first user device. For example, the confirmation can be a response to a query asking the first user whether the first user is sure that he/she wants to transfer this asset. The confirmation can be a selection of a price, for instance through the price requested field 805.

In some examples, the indication of the transfer of usability of the asset includes receipt of an indication of a second transfer of a second asset from an account of the second user. The second transfer is in exchange for the transfer of usability of the asset. Examples of the second transfer include a transfer of the asset 545 as in FIG. 5 and/or a transfer of the asset 540 as in FIG. 5. In some examples, the second asset is an amount of funds that pays for the transfer of usability of the asset. In some examples, the authorization management system is configured to, and can, receive a bid from the second user device for the amount of funds, and receive an acceptance of the bid from the first user device, as in the bidding process illustrated in the interface 700 of FIG. 7 and/or the interface 800 of FIG. 8. In some examples, the authorization management system is configured to, and can, identify an appraisal value associated with the transfer of usability of the asset, wherein the amount of funds is based on the appraisal value, as illustrated in the appraisal process and interface 800 of FIG. 8.

In some examples, the authorization management system is configured to, and can, identify a second asset associated with the video game. The asset is associated with a first platform that the first user device belongs to, while the second asset is associated with a second platform that a third user device belongs to. The third user device is associated with the first user. The authorization management system can, in response to receiving the indication, automatically enable authorization for the third user device to use the second asset. An example of this is illustrated in the interface 900 of FIG. 9. For instance, the Sony® PlayStation® 5 console of the interface 900 can be an example of the third user device, while the PC or Game Box of the interface 900 can be examples of the first user device. Similarly, the Sony® PlayStation® platform of the interface 900 can be an example of the second platform, while the PC or Game Box platforms of the interface 900 can be examples of the first platform. In some examples, the second asset is a variant of the asset that is usable on the second platform, while the asset is usable on the first platform. For example, the video game assets 910 are variants of the video game assets 905 that are usable by the Sony® PlayStation® platform, while the video game assets 905 are usable by other platforms.

In some examples, the authorization management system is configured to, and can, identify that a type of the asset matches a specified type in a rule. In response to identifying that the type of the asset matches the specified type in the rule, the authorization management system can automatically request authorization for the transfer from a third user device associated with a third user. The authorization management system can receive the authorization for the transfer from the third user device associated with the third user, wherein the indication includes the authorization for the transfer. Examples of the authorization include the authorization in the response 1045 and/or the confirmation 1050. In some examples, the third user is a family member of the first user, such as a parent, guardian, or sibling of the first user.

At operation 1220, the authorization management system is configured to, and can, automatically disable authorization for the first user device to use the asset in response to receiving the indication.

At operation 1225, the authorization management system is configured to, and can, automatically enable authorization for the second user device to use the asset in response to receiving the indication.

In some examples, the authorization management system is configured to, and can, identify a distributed ledger that includes a plurality of blocks. Each block of at least a subset of the plurality of blocks includes a hash of at least a portion of another block of the plurality of blocks. The authorization management system can cause an additional block to be appended to the distributed ledger. A payload of the additional block includes a record of the transfer of usability of the asset. The additional block includes a hash of at least a portion of one the plurality of blocks in the distributed ledger. In some examples, the authorization management system is configured to, and can, generate the additional block. In some examples, the distributed ledger is a blockchain ledger. For instance, examples of the distributed ledger include the blockchain ledger 300 and/or a DAG ledger. In some examples, the asset includes a non-fungible token (NFT) associated with the video game, such as the token 400. In some examples, one or more blocks of the plurality of blocks in the distributed ledger identify a smart contract identifying a condition. Detection of the condition is configured to trigger the transfer of usability of the asset according to the smart contract. The indication can includes verification of detection of the condition, for example as in the verification of the smart contract illustrated in FIGS. 11A-11B.

Figure 13:
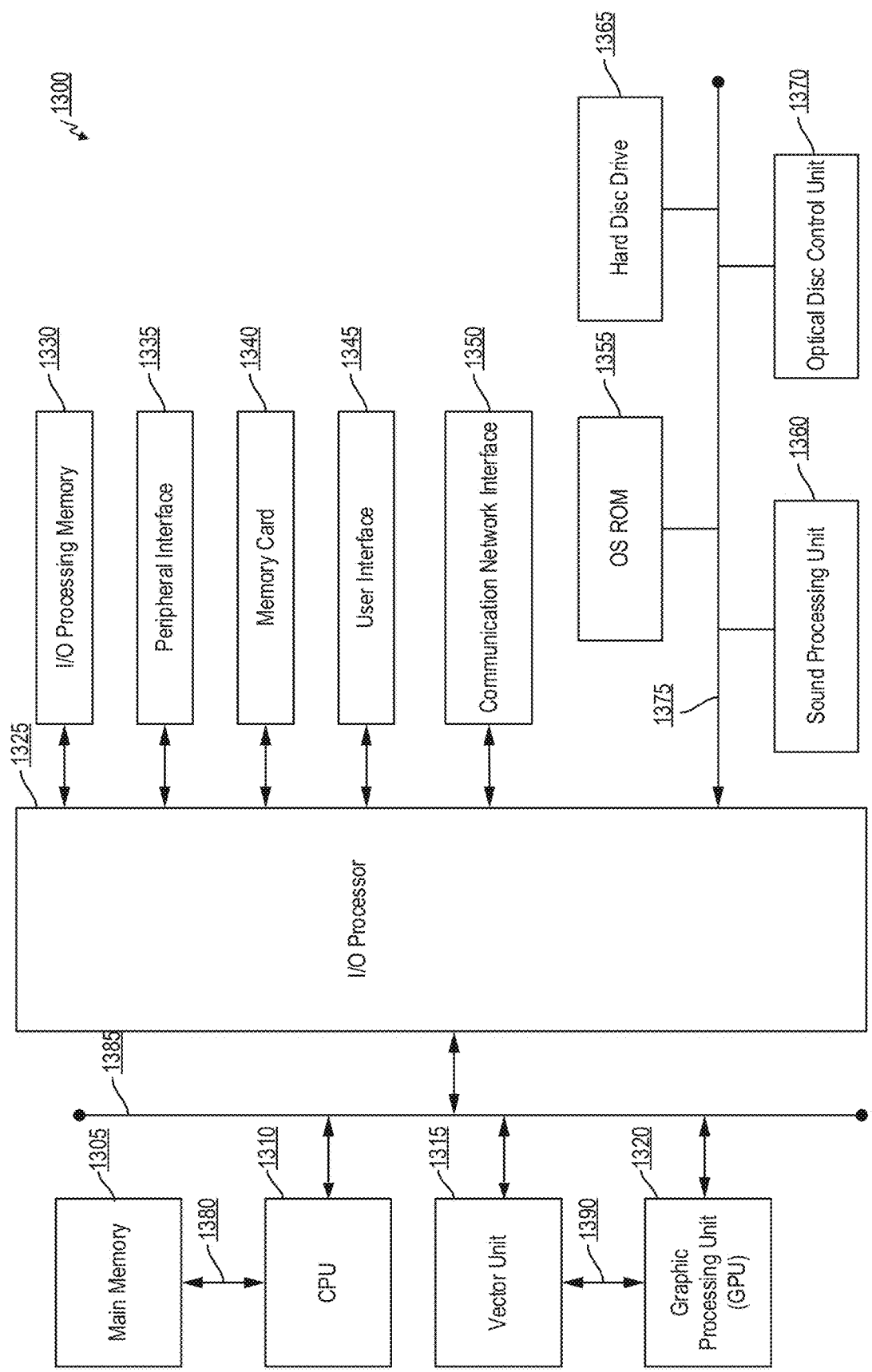
FIG. 13 illustrates an example electronic entertainment system that may be used in media-object binding and displaying real-time play data for a streaming media based on one or more objects displaying therein, according to an aspect of the present disclosure.

FIG. 13 is an example user electronic entertainment system that may be used in launching interactive content and providing dynamic interfaces, according to an aspect of the present disclosure. The entertainment system 1300 of FIG. 13 includes a main memory 1305, a central processing unit (CPU) 1310, vector unit 1315, a graphics processing unit 1320, an input/output (I/O) processor 1325, an I/O processor memory 1330, a peripheral interface 1335, a memory card 1340, a Universal Serial Bus (USB) interface 1345, and a communication network interface 1350. The entertainment system 1300 further includes an operating system read-only memory (OS ROM) 1355, a sound processing unit 1360, an optical disc control unit 1370, and a hard disc drive 1365, which are connected via a bus 1375 to the I/O processor 1325.

Entertainment system 1300 may be an electronic game console. Alternatively, the entertainment system 1300 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 1310, the vector unit 1315, the graphics processing unit 1320, and the I/O processor 1325 of FIG. 13 communicate via a system bus 1385. Further, the CPU 1310 of FIG. 13 communicates with the main memory 1305 via a dedicated bus 1380, while the vector unit 1315 and the graphics processing unit 1320 may communicate through a dedicated bus 1390. The CPU 1310 of FIG. 13 executes programs stored in the OS ROM 1355 and the main memory 1305. The main memory 1305 of FIG. 13 may contain pre-stored programs and programs transferred through the I/O Processor 1325 from a CD-ROM, DVD-ROM, or other optical disc (not shown) using the optical disc control unit 1370. I/O Processor 1325 of FIG. 13 may also allow for the introduction of content transferred over a wireless or other communications network (e.g., 4G, LTE, 1G, and so forth). The I/O processor 1325 of FIG. 13 primarily controls data exchanges between the various devices of the entertainment system 1300 including the CPU 1310, the vector unit 1315, the graphics processing unit 1320, and the peripheral interface 1335.

The graphics processing unit 1320 of FIG. 13 executes graphics instructions received from the CPU 1310 and the vector unit 1315 to produce images for display on a display device (not shown). For example, the vector unit 1315 of FIG. 13 may transform objects from three-dimensional coordinates to two-dimensional coordinates, and send the two-dimensional coordinates to the graphics processing unit 1320. Furthermore, the sound processing unit 1360 executes instructions to produce sound signals that are outputted to an audio device such as speakers (not shown). Other devices may be connected to the entertainment system 1300 via the USB interface 1345, and the communication network interface 1350 such as wireless transceivers, which may also be embedded in the system 1300 or as a part of some other component such as a processor.

A user of the entertainment system 1300 of FIG. 13 provides instructions via the peripheral interface 1335 to the CPU 1310, which allows for use of a variety of different available peripheral devices (e.g., controllers) known in the art. For example, the user may instruct the CPU 1310 to store certain game information on the memory card 1340 or other non-transitory computer-readable storage media or instruct a character in a game to perform some specified action.

The present disclosure pertain to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described aspects of the present disclosure were chosen in order to adequately explain the principles of the technology, its practical application, and to enable others skilled in the art to utilize the technology along with various modifications as are suited to the particular use contemplated. It is intended that the scope of the technology be defined by the claim.

What is claimed is:

1. A system of in-stream digital asset usability for automated game stream modifications, the system comprising:
a memory that stores instructions and a data structure;
a communication interface that streams a game stream associated with a video game over a communication network to a first video game console; and
a processor that executes instructions stored in memory to:
generate a smart contract that is executable to automatically transfer in-stream usability of a digital asset when a trigger condition is met, wherein the smart contract is included within a payload of a most recent block of a distributed ledger;
verify that the most recent block of the distributed ledger indicates that the first video game console has authorization from a video game platform to use the digital asset within the game stream during a first time period and that a second video game console lacks authorization from the video game platform to use the digital asset within the game stream during the first time period;
generate a display of a portion of the game stream that includes an image depicting the digital asset during the first time period of gameplay by the first video game console in accordance with the first video game console having the authorization, wherein generating the display includes importing the image of the digital asset into the portion of the game stream;
track gameplay activity data of the first video game console in the data structure, the gameplay activity data regarding use of the digital asset to modify gameplay depicted within the game stream during the first time period;
verify that the data structure includes the tracked gameplay activity data indicating that the trigger condition of the smart contract is met based on a detected interaction between the first video game console and the second video game console through the video game platform;
automatically execute the smart contract to initiate an automatic transfer of the in-stream usability of the digital asset, wherein the automatic transfer includes:
generating a new block to append to the distributed ledger, wherein a payload of the new block reflects transfer of token information representing the digital asset from a first account associated with the first video game console to a second account associated with the second video game console, the token information including data corresponding to the image,
deleting an instance of the digital asset stored at the first video game console in accordance with the new block, wherein deleting the instance is associated with automatically disabling the authorization provided by the video game platform for the first video game console to use the digital asset, wherein the first video game console is no longer authorized to use the image of the digital asset within the game stream during a second time period after the first time period in accordance with the disabled authorization, and
generating a display of a second portion of the game stream that includes the image depicting the digital asset during the second time period of gameplay by the second video game console, wherein generating the display is associated with automatically enabling the authorization from the video game platform for the second video game console to use the digital asset, wherein the second video game console is authorized to use the image of the digital asset for gameplay within the game stream during the second time period in accordance with the enabled authorization; and
track, in the data structure, further gameplay activity involving the digital asset based on use by the second video game console of the digital asset to modify gameplay depicted within the game stream during the second time period;
wherein the communication interface streams the portion of the game stream during the second time period from the video game platform to the second video game console, and wherein the second video game console imports the image into the portion of the game stream for gameplay using the digital asset during the second time period.

2. The system of claim 1, wherein the digital asset is an instance of the video game.

3. The system of claim 1, wherein the digital asset includes in-game content associated with the video game, wherein the in-game content is usable by a player of the video game within the video game during gameplay of the video game by the player through the video game platform, wherein the player is associated with at least one of the first video game console or the second video game console.

4. The system of claim 1, wherein the verification that the data structure includes the tracked gameplay activity data indicating that the trigger condition is met includes a confirmation for the transfer from the first video game console.

5. The system of claim 1, wherein verifying that the data structure includes the tracked gameplay activity data indicating that the trigger condition is met is further based on an indication of a second automatic transfer of a second asset from an account associated with the second video game console, wherein the second automatic transfer is in exchange for the transfer of usability of the digital asset.

6. The system of claim 5, wherein the second asset is an amount of funds.

7. The system of claim 5, wherein the execution of the instructions by the processor causes the processor to:
receive a bid from the second video game console for the second asset; and
receive an acceptance of the bid from the first video game console.

8. The system of claim 6, wherein execution of the instructions by the processor causes the processor to:
identify an appraisal value associated with the automatic transfer of usability of the digital asset, wherein the amount of funds is based on the appraisal value.

9. The system of claim 1, wherein the execution of the instructions by the processor causes the processor to:
identify a characteristic of a first user associated with the first video game console;
identify a plurality of characteristics of a plurality of users, wherein the plurality of users includes a second user associated with the second video game console;
identify, based on a comparison between the characteristic of the first user and the plurality of characteristics of the plurality of users, that the second user shares the characteristic of the first user; and select the second video game console for the automatic transfer of usability of the digital asset based on the characteristic being shared by the first user and the second user.

10. The system of claim 1, wherein the execution of the instructions by the processor causes the processor to:

identify a second asset associated with the video game, wherein the second digital asset is associated with a second video game platform that a third video game console belongs to, wherein the third video game console lacks authorization from the second video game platform to use the second digital asset for gameplay on the second video game platform during the first time period; and in response to the verification that the data structure includes the tracked gameplay activity data indicating that the trigger condition is met, automatically enable the authorization from the second video game platform for the third video game console to use the second digital asset for gameplay on the second video game platform during the second time period.

11. The system of claim 10, wherein the second asset is a variant of the digital asset that is usable on the second video game platform, wherein the digital asset is usable on the first video game platform, wherein the first video game console and the third video game console are both associated with a user.

12. The system of claim 1, wherein execution of the instructions by the processor causes the processor to:

identify that a type of the digital asset matches a specified type indicated in a rule;

automatically request authorization from a user device for the automatic transfer of usability of the digital asset; and receive the authorization for the user device, wherein verifying that the data structure includes the tracked gameplay activity data indicating that the trigger condition is met is further based on the authorization from the user device.

13. The system of claim 12, wherein the user device is associated with at least one of a first user or a family member of a first user, wherein the first user is associated with the first video game console.

14. The system of claim 1, wherein the distributed ledger includes a plurality of blocks, wherein each block of at least a subset of the plurality of blocks includes a hash of at least a portion of another block of the plurality of blocks, wherein the new block includes a hash of at least a portion of one the plurality of blocks in the distributed ledger.

15. The system of claim 1, wherein the execution of the instructions by the processor causes the processor to generate at least a portion of the most recent block.

16. The system of claim 1, wherein the distributed ledger is a blockchain ledger.

17. The system of claim 1, wherein the token information is associated with a non-fungible token (NFT).

18. The system of claim 1, wherein the distributed ledger includes at least one reference to off-chain data external to the distributed ledger.

19. A method of in-stream digital asset usability for automated game stream modifications, the method comprising:

streaming a game stream associated with a video game over a communication network to a first video game console during a first time period;

generating a smart contract that is executable to automatically transfer in-stream usability of a digital asset when a trigger condition is met, wherein the smart contract is included within a payload of a most recent block of a distributed ledger;

verifying that the most recent block of the distributed ledger also indicates that the first video game console has authorization from a video game platform to use a digital asset for gameplay within the game stream during the first time period and that a second video game console lacks authorization from the video game platform to use the digital asset within the game stream during the first time period;

generating a display of a portion of the game stream that includes an image depicting the digital asset during the first time period of gameplay by the first video game console in accordance with the first video game console having the authorization, wherein generating the display includes importing the image of the digital asset into the portion of the game stream;

tracking gameplay activity data of the first video game console in the data structure, the gameplay activity data regarding use of the digital asset to modify gameplay depicted within the game stream during the first time period;

verifying that the data structure includes the tracked gameplay activity data indicating that the trigger condition of the smart contract is met based on a detected interaction between the first video game console and the second video game console through the video game platform;

automatically executing the smart contract to initiate an automatic transfer of the in-stream usability of the digital asset, wherein the automatic transfer includes:

generating a new block to append to the distributed ledger, wherein a payload of the new block reflects transfer of token information representing the digital asset from a first account associated with the first video game console to a second account associated with the second video game console, the token information including data corresponding to the image, deleting an instance of the digital asset stored at the first video game console in accordance with the new block, wherein deleting the instance is associated with automatically disabling the authorization provided by the video game platform for the first video game console to use the digital asset, wherein the first video game console is no longer authorized to use the image of the digital asset within the game stream during a second time period after the first time period in accordance with the disabled authorization, and generating a display of a second portion of the game stream that includes the image depicting the digital asset during the second time period of gameplay by the second video game console, wherein generating the display is associated with automatically enabling the authorization from the video game platform for the second video game console to use the digital asset, wherein the second video game console is authorized to use the image of the digital asset within the game stream during the second time period in accordance with the enabled authorization;

tracking, in the data structure, further gameplay activity involving the digital asset based on use by the second video game console of the digital asset to modify gameplay depicted within the game stream during the second time period; and streaming the portion of the game stream during the second time period from the video game platform to the second video game console, and wherein the second video game console imports the image into the portion of the game stream for gameplay using the digital asset during the second time period.

20. A non-transitory computer-readable storage medium having embodied thereon a program, wherein the program is executable by a processor to perform a method of in-stream digital asset usability for automated game stream modifications, the method comprising:

streaming a game stream associated with a video game over a communication network to a first video game console during a first time period;

generating a smart contract that is executable to automatically transfer in-stream usability of a digital asset when a trigger condition is met, wherein the smart contract is included within a payload of a most recent block of a distributed ledger;

verifying that the most recent block of the distributed ledger also indicates that the first video game console has authorization from a video game platform to use a digital asset for gameplay within the game stream during the first time period and that a second video game console lacks authorization from the video game platform to use the digital asset within the game stream during the first time period;

generating a display of a portion of the game stream that includes an image depicting the digital asset during the first time period of gameplay by the first video game console in accordance with the first video game console having the authorization, wherein generating the display includes importing the image of the digital asset into the portion of the game stream;

tracking gameplay activity data of the first video game console in a data structure, the gameplay activity data regarding use of the digital asset to modify gameplay depicted within the game stream during the first time period;

verifying that the data structure includes the tracked gameplay activity data indicating that the trigger condition of the smart contract is met based on a detected interaction between the first video game console and the second video game console through the video game platform;

automatically executing the smart contract to initiate an automatic transfer of the in-stream usability of the digital asset, wherein the automatic transfer includes:

generating a new block to append to the distributed ledger, wherein a payload of the new block reflects transfer of token information representing the digital asset from a first account associated with the first video game console to a second account associated with the second video game console, the token information including data corresponding to the image, deleting an instance of the digital asset stored at the first video game console in accordance with the new block, wherein deleting the instance is associated with automatically disabling the authorization provided by the video game platform for the first video game console to use the digital asset, wherein the first video game console is no longer authorized to use the image of the digital asset within the game stream during a second time period after the first time period in accordance with the disabled authorization, and generating a display of a second portion of the game stream that includes the image depicting the digital asset during the second time period of gameplay by the second video game console, wherein generating the display is associated with automatically enabling the authorization from the video game platform for the second video game console to use the digital asset, wherein the second video game console is authorized to use the image of the digital asset within the game stream during the second time period in accordance with the enabled authorization;

tracking, in the data structure, further gameplay activity involving the digital asset based on use by the second video game console of the digital asset to modify gameplay depicted within the game stream during the second time period; and streaming the portion of the game stream during the second time period from the video game platform to the second video game console, and wherein the second video game console imports the image into the portion of the game stream for gameplay using the digital asset during the second time period.

* * * * *